US009356485B2

(12) United States Patent
Matsuda

(10) Patent No.: US 9,356,485 B2
(45) Date of Patent: May 31, 2016

(54) STARTING ASSIST METHOD AND STARTING ASSIST SYSTEM OF ELECTRIC VEHICLE

(75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 274 days.

(21) Appl. No.: 13/976,984

(22) PCT Filed: Dec. 28, 2010

(86) PCT No.: PCT/JP2010/007615
§ 371 (c)(1),
(2), (4) Date: Jul. 17, 2013

(87) PCT Pub. No.: WO2012/090255
PCT Pub. Date: Jul. 5, 2012

(65) Prior Publication Data
US 2013/0300236 A1 Nov. 14, 2013

(51) Int. Cl.
H02K 7/02 (2006.01)
B60L 15/20 (2006.01)
(Continued)

(52) U.S. Cl.
CPC . *H02K 7/025* (2013.01); *B60L 7/14* (2013.01); *B60L 7/26* (2013.01); *B60L 11/1803* (2013.01); *B60L 11/1816* (2013.01); *B60L 11/1861* (2013.01); *B60L 11/1877* (2013.01); *B60L 15/2054* (2013.01); *B60L 15/2072* (2013.01); *H02K 7/108* (2013.01); *H02K 7/116* (2013.01); *B60L 2200/12* (2013.01);
(Continued)

(58) Field of Classification Search
CPC ..... F02N 19/001; F02N 15/063; B60L 11/14; B60L 15/20; H02K 7/025

USPC ......... 318/62, 272, 101, 64, 161; 180/65.265, 180/65.23, 65.275; 477/174, 5; 701/22; 76/664; 123/179.22; 310/74
See application file for complete search history.

(56) References Cited

U.S. PATENT DOCUMENTS

| 1,737,802 | A | * | 12/1929 | McGrath | 123/179.22 |
| 1,739,469 | A | * | 12/1929 | Lansing | 123/179.22 |
| 1,784,190 | A | * | 12/1930 | Lansing | 123/179.22 |
| 1,900,063 | A | * | 3/1933 | Lansing | 290/38 B |
| 1,927,714 | A | * | 9/1933 | Nardone | 123/179.22 |

(Continued)

FOREIGN PATENT DOCUMENTS

| JP | 5-137210 | A | * | 1/1993 | B60L 11/16 |
| JP | 5-137210 | | * | 6/1993 | B60L 11/16 |

(Continued)

OTHER PUBLICATIONS

Japanese Patent Office, International Search Report of PCT/JP2010/007615, WIPO, Apr. 12, 2011, 2 pages.

*Primary Examiner* — Rita Leykin
(74) *Attorney, Agent, or Firm* — Alleman Hall McCoy Russell & Tuttle LLP

(57) ABSTRACT

An electric motorcycle includes an electric driving unit including an electric motor and a power transmission mechanism, and is configured to halt supplying of electric power to the electric motor for at least a period in the stopped state. A starting assist method is executed in the electric motorcycle. The starting assist method comprises the steps of activating the electric motor and rotating a rotor by itself to store rotation energy in the rotor, keeping the rotation energy stored in the rotor in the step of storing the rotation energy, in a stopped state of the electric motorcycle, and transmitting the rotation energy of the rotor kept in the step of keeping the rotation energy to the rear wheel as starting assist power.

19 Claims, 14 Drawing Sheets

(51) Int. Cl.
*H02K 7/108* (2006.01)
*H02K 7/116* (2006.01)
*B60L 11/18* (2006.01)
*B60L 7/14* (2006.01)
*B60L 7/26* (2006.01)

(52) U.S. Cl.
CPC ......... *B60L 2220/46* (2013.01); *B60L 2240/12* (2013.01); *B60L 2240/421* (2013.01); *B60L 2240/423* (2013.01); *B60L 2240/461* (2013.01); *B60L 2240/507* (2013.01); *B60L 2240/526* (2013.01); *B60L 2240/527* (2013.01); *B60L 2250/24* (2013.01); *B60L 2250/26* (2013.01); *B60L 2260/22* (2013.01); *B60L 2260/26* (2013.01); *Y02E 60/16* (2013.01); *Y02T 10/641* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7275* (2013.01); *Y02T 10/92* (2013.01); *Y02T 90/14* (2013.01)

(56) References Cited

U.S. PATENT DOCUMENTS

| | | | | |
|---|---|---|---|---|
| 1,934,806 | A | * | 11/1933 | Lansing .................. 123/179.22 |
| 1,955,110 | A | * | 4/1934 | Brockway ........................ 74/9 |
| 1,996,667 | A | * | 4/1935 | Beymer .................. 123/179.22 |
| 3,199,371 | A | * | 8/1965 | Lins et al. ........................ 74/664 |
| 5,846,155 | A | * | 12/1998 | Taniguchi ................ B60K 6/48 180/65.25 |
| 6,464,028 | B1 | * | 10/2002 | Imani ...................... B60K 6/26 180/65.25 |
| 6,887,180 | B2 | * | 5/2005 | Pels ........................ B60K 6/36 477/3 |
| 8,113,976 | B2 | * | 2/2012 | Abe ........................ B60K 6/26 180/285 |
| 8,480,522 | B2 | * | 7/2013 | Akutsu .................... B60K 6/26 180/65.225 |

FOREIGN PATENT DOCUMENTS

| | | |
|---|---|---|
| JP | 05137210 A | 6/1993 |
| JP | 2010018270 A | 1/2010 |
| JP | 2010254014 A | 11/2010 |

* cited by examiner

STARTING ASSIST METHOD AND STARTING ASSIST SYSTEM OF ELECTRIC VEHICLE

TECHNICAL FIELD

The present invention relates to a starting assist method and a starting assist system of an electric vehicle for driving a drive wheel by using an electric motor.

BACKGROUND ART

There is known an electric vehicle which includes no engine and drives a drive wheel by using an electric motor. The electric vehicle includes a battery as well as the electric motor. The electric motor drives the drive wheel by electric power supplied from the battery to the electric motor and thereby the electric vehicle drives. An example of such an electric vehicle, an electric vehicle disclosed in Patent Literature 1 is known.

CITATION LIST

Patent Literature

Patent Literature 1: Japanese Laid-Open Patent Application Publication No. 2010-018270

SUMMARY OF INVENTION

Technical Problem

The electric motor included in the electric vehicle disclosed in Patent Literature 1 is configured to generate rotational power corresponding to an amount of the electric power supplied to the electric motor, in a case where its output shaft is rotating continuously, for example, during driving of the electric vehicle. By comparison, during starting of the electric vehicle, it is necessary to start the electric vehicle in a stopped state. Therefore, an amount of the electric power supplied at this time is greater than the amount of electric power supplied to the electric motor to generate the rotational power. For this reason, if starting and stop occur repetitively, the amount of consumed electric power becomes significant.

Accordingly, an object of the present invention is to provide a starting assist method and a starting assist system of the electric vehicle, which can reduce an amount of electric power consumed during starting.

Solution to Problem

A starting assist method of the present invention is a starting assist method of an electric vehicle including an electric driving unit including an electric motor for rotating an output shaft by electric power supplied to the electric motor and a power transmission mechanism for transmitting rotational power of the output shaft to a drive wheel to rotate the drive wheel and being configured to halt supplying of the electric power to the electric motor for at least a certain period in a stopped state of the electric vehicle, the method comprising the steps of: applying rotational power of a rotary member included in the electric driving unit to a predetermined rotary element to rotate the rotary element to store a rotation energy in the rotary element; keeping the rotation energy of the rotary element stored in the step of storing the rotation energy, during the stopped state; and transmitting the rotation energy of the rotary element kept in the step of keeping the rotation energy to the drive wheel as starting assist power, and starting the electric vehicle using the starting assist power.

In accordance with the present invention, since the rotation of the output shaft is halted for a certain period in the stopped state of the electric vehicle, the electric power consumption during the stopped state can be lessened. In the step of starting the electric vehicle using the starting assist power, since the rotation energy stored in the step of storing the rotation energy is transmitted to the drive wheel as the starting assist power, the rotational power required for the starting can be attained by the rotational power generated by the electric motor and the starting assist power transmitted from the rotary element. This makes it possible to reduce the driving power to be generated by the electric motor during starting of the electric vehicle, and lessen the electric power required during the starting. In addition, the rotational power of a greater magnitude can be attained than in a case where the electric vehicle is started only by using the electric motor, and an acceleration force of the drive wheel during the starting can be increased.

In the above invention, preferably, the starting assist method of the electric vehicle may further comprise disconnecting a portion of a power transmission path from the electric motor to the drive wheel by a power transmission path disconnection mechanism provided on the power transmission path; wherein the step of storing the rotation energy is executed during a period other than the certain period in the stopped state; wherein in the step of storing the rotation energy, after the step of disconnecting a portion of the power transmission path, the electric motor which is the rotary member rotates as the rotary element an upstream member which is located upstream of the power transmission path disconnection mechanism in a power transmission direction on the power transmission path; wherein in the step of keeping the rotation energy, a state in which a portion of the power transmission path is disconnected in the step of disconnecting a portion of the power transmission path is kept; and wherein in the step of starting the electric vehicle using the starting assist power, a portion of the power transmission path is connected by the power transmission path disconnection mechanism, and the rotation energy of the upstream member rotating is transmitted as the starting assist power to the drive wheel via a downstream member which is located downstream of the power transmission path disconnection mechanism on the power transmission path.

In accordance with this configuration, the power transmission path disconnection mechanism disconnects a portion of the power transmission path, and thereby the rotation energy can be stored in the rotary element for at least a period other than the certain period in the stopped state of the electric vehicle by using the electric motor, and the stored rotation energy can be used as the starting assist power during starting of the electric vehicle. Required rotational power is smaller in the case where a portion of the power transmission path is disconnected than in a case where a portion of the power transmission path is connected. Since a weight of the rotary element is smaller relative to a weight of the entire power transmission path, rotational power required for initial motion is smaller in the case where the rotary element is rotated than in a case where the drive wheel is rotated. Because of this, instantaneous electric power supplied to activate the electric motor for initial motion can be lessened by storing the rotation energy in the rotary element, and as a result, the electric power consumption during starting can be lessened.

In the above invention, preferably, the starting assist method of the electric vehicle, further comprises determining whether or not a predetermined energy storing start condition is satisfied, by an electric motor control device for controlling a rotation operation of the output shaft of the electric motor; wherein the step of storing the rotation energy is started after it is determined that the energy storing start condition is satisfied in the step of determining whether or not the predetermined energy storing start condition is satisfied; the method further comprising: halting supplying of the electric power to the electric motor after it is determined that a predetermined energy storing completion condition is satisfied in the step of storing the rotation energy.

In accordance with this configuration, when the energy storing start condition is satisfied, the rotation energy is automatically stored in the rotary element, while when the energy storing completion condition is satisfied, supplying of the electric power to the electric motor is halted automatically. This makes it possible to prevent a situation in which the electric power continues to be supplied to the electric motor, and lessen the electric power consumption in the electric motor.

In the above invention, preferably, the starting assist method of the electric vehicle further comprises determining whether a starting assist mode in which the electric motor control device generates the starting assist power or a normal mode in which the electric motor control device does not generate the starting assist power has been selected; wherein when it is determined that the starting assist mode has been selected in the step of determining whether the starting assist mode or the normal mode has been selected, the step of storing the rotation energy is permitted to be initiated; and wherein when it is determined that the normal mode has been selected in the step of determining whether the starting assist mode or the normal mode has been selected, the step of storing the rotation energy is not permitted to be initiated.

In accordance with this configuration, when the normal mode is selected, it is possible to prevent the electric power from being supplied to the electric motor to store the rotation energy, for example, in a case where electric power consumption in the electric motor during starting is less, i.e., the starting assist power is unnecessary, like a case where, the electric motorcycle is going to start on a downward slope. Therefore, the electric power consumption in the electric motor can be lessened.

In the above invention, preferably, in the step of keeping the rotation energy, a rotary element disconnection mechanism disconnects the rotary member and the rotary element from each other, and a state in which the rotary member and the rotary element are disconnected from each other is kept; and in the step of starting the electric vehicle using the starting assist power, the rotary element disconnection mechanism connects the rotary member and the rotary element to each other, and the rotation energy of the rotary element rotating is transmitted to the drive wheel via the rotary member as the starting assist power.

In accordance with this configuration, the rotary element is rotated and stores the rotation energy therein, and thereafter, the rotary element disconnection mechanism disconnects the rotary member and the rotary element from each other, so that the stored energy can be kept when the rotary member is not rotating. Thus, the rotation energy is stored in the rotary element during driving of the electric vehicle, the stored energy is kept during the stopped state of the electric vehicle, and the rotation energy is used as the starting assist power during starting of the electric vehicle. Thus, energy can be utilized efficiently, and the electric power consumption in the electric motor can be suppressed.

In the above invention, preferably, the starting assist method of the electric vehicle may further comprise determining whether or not the electric vehicle is decelerated in a state in which the rotary element disconnection mechanism disconnects the rotary member and the rotary element from each other; wherein the step of storing the rotation energy is started after it is determined that the electric vehicle is decelerated in the step of determining whether or not the electric vehicle is decelerated, and the rotary member and the rotary element are connected to each other to store the rotation energy in the rotary element in the step of storing the rotation energy.

In accordance with this configuration, during deceleration, the rotary element is rotated, the rotation energy of the drive wheel is stored in the rotary element, and thus the drive wheel is decelerated. That is, since a portion of the energy converted into brake heat or the like and lost during deceleration is recovered as the rotation energy, electric power consumption in the electric motor during starting can be lessened.

In the above invention, preferably, the rotary element disconnection mechanism is provided on a starting assist power transmission path which branches from the power transmission path from the electric motor to the drive wheel and connects the rotary member and the rotary element to each other; and in the step of keeping the rotation energy, driving power is able to be transmitted between the electric motor and the drive wheel on the power transmission path, and the rotary element disconnection mechanism disconnects the rotary member and the rotary element from each other.

In the above configuration, in the step of keeping the rotation energy, irrespective of a power transmission state between the electric motor and the drive wheel, the rotation of the rotary element can be kept, or halted. For example, the disconnected state is kept during starting, and thus, the electric vehicle can be started without using the energy stored in the rotary element as the starting assist power. Or, the disconnected state is formed after the starting, and thus the drive wheel can be rotated without keeping the rotation of the rotary element or accelerating the rotation. Or, the disconnected state is formed in a state in which the rotary element is rotating during driving, and thus the electric vehicle can drive while keeping the rotation energy of the rotary element. Or, when the rotation energy of the rotary element is running short during driving, the disconnected state is shifted to the connected state in which the rotary member and the rotary element are connected to each other, so that the rotation energy can be stored again in the rotary element.

In the above invention, preferably, the starting assist method of the electric vehicle further comprise determining whether or not a predetermined termination condition is satisfied, in the step of starting the electric vehicle using the starting assist power; and disconnecting the rotary member and the rotary element from each other by the rotary element disconnection mechanism to terminate starting assist when it is determined that the termination condition is satisfied in the step of determining whether or not the predetermined termination condition is satisfied.

In accordance with this configuration, when the starting assist termination condition is satisfied, the rotary member and the rotary element are disconnected from each other. In a case where the assist power becomes necessary in the middle of driving, for example, the disconnected state is formed especially during acceleration. In this way, the power of the electric motor for rotating the rotary element can be used to accelerate the drive wheel. As a result, acceleration power can be increased.

In the above invention, preferably, the starting assist method of the electric vehicle may further comprise supplying the electric power to the electric motor to rotate the output shaft to start the electric vehicle, when the electric motor control device for controlling the rotation operation of the output shaft of the electric motor detects an acceleration command for increasing or decreasing a degree of acceleration in response to an operation amount of an acceleration command input device; and the step of starting the electric vehicle using the starting assist power and the step of starting the electric vehicle are executed when a predetermined starting assist condition is satisfied based on the acceleration command in the step of starting the electric vehicle; and in the step of starting the electric vehicle using the starting assist power, the rotary element disconnection mechanism connects the rotary member and the rotary element to each other.

In accordance with this configuration, whether or not to execute the starting assist is selected based on the acceleration command. In a case where the operation amount of the acceleration command is great and the rotational power of a greater magnitude is necessary, the starting assist power can be transmitted to the drive wheel. On the other hand, in a case where the operation amount of the acceleration command is small and the rotational power of a greater magnitude is not necessary, the starting assist power is not transmitted and can be kept. Since whether or not to use the starting assist power can be selected according to a situation, convenience can be improved.

A starting assist system of the present invention is a starting assist system of an electric vehicle including an electric driving unit including an electric motor for generating electric motor driving power by electric power supplied to the electric motor and a power transmission mechanism for transmitting the electric motor driving power to a drive wheel to rotate the drive wheel, the system comprising: a rotary element which is rotatably supported and is rotatable by rotational power applied to the rotary element, by a rotary member included in the electric driving unit; a switching mechanism which is provided between the rotary element and the drive wheel and is capable of performing switching between a connected state in which the rotary element and the drive wheel are connected to each other, and a disconnected state in which the rotary element and the drive wheel are disconnected from each other; a switching mechanism activating device for activating the switching mechanism to cause the switching mechanism to perform switching between the connected state and the disconnected state; and an electric motor control device for controlling an operation of the electric motor by supplying electric power to the electric motor and halts supplying of the electric power to the electric motor for at least a certain period in a stopped state of the electric vehicle; wherein when the switching mechanism activating device switches the switching mechanism to the disconnected state, and as a result, the switching mechanism disconnects the rotary element and the drive wheel from each other, the rotary element rotates by itself and keeps a rotation energy in the stopped state of the electric vehicle; wherein when the switching mechanism activating device switches the switching mechanism to the connected state in a state in which the rotation energy is stored in the rotary element in the stopped state of the electric vehicle, the switching mechanism connects the rotary element and the drive wheel to each other to transmit the rotation energy of the rotary element to the drive wheel as starting assist power different from the electric motor driving power.

In accordance with the present invention, since the rotation of the output shaft is halted for a certain period in the stopped state of the electric vehicle, the electric power consumption during the stopped state can be lessened. In the step of starting the electric vehicle using the starting assist power, since the rotation energy stored in the step of storing the rotation energy is transmitted to the drive wheel as the starting assist power, the rotational power required for the starting can be attained by the rotational power generated by the electric motor and the starting assist power transmitted from the rotary element. This makes it possible to reduce the driving power to be generated by the electric motor during starting of the electric vehicle, and lessen the electric power required during the starting. In addition, the rotational power of a greater magnitude can be attained than in a case where the electric vehicle is started only by using the electric motor, and an acceleration force of the drive wheel during the starting can be increased.

In the above invention, preferably, the switching mechanism is provided on a power transmission path from the electric motor to the drive wheel; and wherein the rotary element is an upstream member which is located upstream of the switching mechanism in a power transmission direction on the power transmission path.

In accordance with this configuration, the switching mechanism switches to the disconnected state, during the stopped state, and thus, the upstream member which is located upstream in the power transmission direction on the power transmission path is rotated in a state in which it is separated from a downstream member which is located downstream in the power transmission direction on the power transmission path. This allows the rotation energy to be stored in the rotary element in a stopped state of the drive wheel. During starting, the switching mechanism switches to the connected state to connect the upstream member to the downstream member, and thus the rotation energy stored in the upstream member can be applied to the drive wheel, as the starting assist power different from the electric motor driving power.

In the above invention, preferably, the rotary element is provided on a starting assist power transmission path which branches from the power transmission path from the electric motor to the drive wheel.

In accordance with this configuration, the rotation of the rotary element can be kept or halted, irrespective of a power transmission state between the electric motor and the drive wheel. For example, by switching the switching mechanism to the connected state during driving, etc., the rotational power of the rotary member is applied to the rotary element and the rotation energy is stored in the rotary element. By switching the switching mechanism from the connected state to the disconnected state, the rotation of the rotary element can be kept after the rotation of the rotary member stops, i.e., during the stopped state of the electric vehicle. By switching the switching mechanism to the connected state again during starting, the rotation energy stored in the rotary element is applied to the drive wheel via the rotary member as the starting assist power.

In the above invention, preferably, the switching mechanism activating device includes a driving mechanism which activates the switching mechanism to switch the switching mechanism between the connected state and the disconnected state; and a control section for controlling an operation of the driving mechanism; and the control section causes the driving mechanism to generate the starting assist power when the control section determines that a predetermined starting assist condition is satisfied.

In accordance with this configuration, since the generation of the starting assist power can be controlled based on the starting assist condition preset by the control section, the driver's operation (manipulation) can be lessened.

In the above invention, preferably, the starting assist system of the electric vehicle further comprises an acceleration command input device for inputting an acceleration command for causing the electric vehicle to be accelerated; wherein the control section controls the driving mechanism to cause the switching mechanism to switch to the connected state, when the acceleration command is input in a state in which the switching mechanism is in the disconnected state.

In accordance with this configuration, since the control section of the switching mechanism activating device switches the switching mechanism to the connected state automatically, the driver need not to perform an operation (manipulation) for switching the switching mechanism. As a result, the driver's operation (manipulation) can be lessened.

In the above invention, preferably, the starting assist system of the electric vehicle may further comprise a switching command input device for inputting a switching command for causing the switching mechanism to perform switching between the connected state and the disconnected state; wherein the switching mechanism activating device activates the switching mechanism to perform switching between the connected state and the disconnected state in response to the switching command from the switching command input device.

In accordance with this configuration, the driver can switch the switching mechanism between the connected state and the disconnected by using the switching command input device according to the driver's intention. This allows the driver to select whether or not to use the starting assist power.

Advantageous Effects of Invention

In accordance with the present invention, electric power consumption during starting can be lessened.

DESCRIPTION OF EMBODIMENTS

Figure 1:
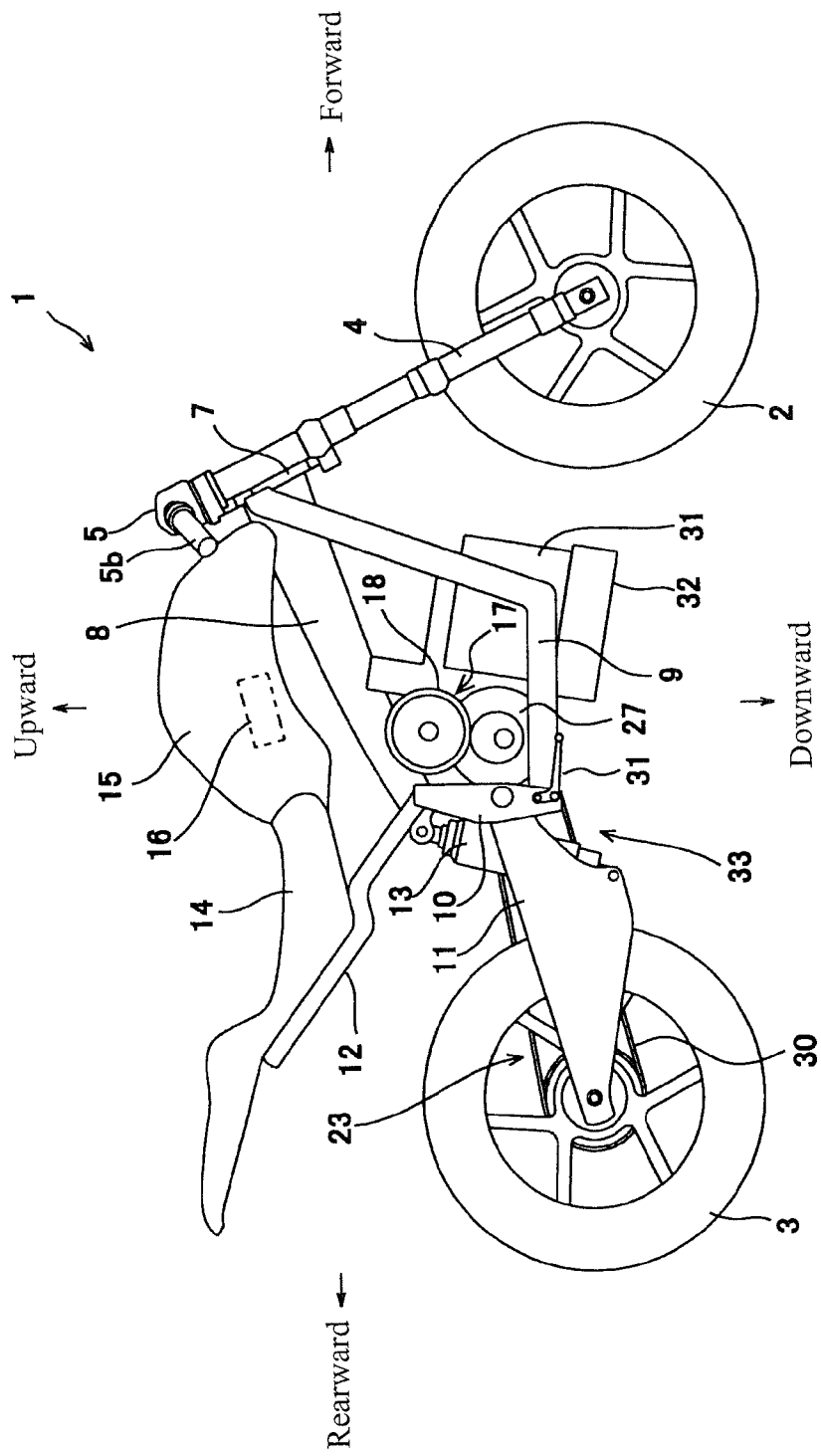
FIG. 1 is a right side view of an electric motorcycle as an example of an electric vehicle including a starting assist system according to Embodiment 1 of the present invention.

Hereinafter, embodiments of the present invention will be described with reference to the drawings. Hereinafter, an electric motorcycle 1 will be exemplarily described as the embodiments of an electric vehicle including any of starting assist systems 45, and 45A to 45E of the present invention. The stated directions are from the perspective of the driver which straddles the electric motorcycle 1. Throughout the drawings, the same or corresponding components are identified by the same reference numerals, and repetitive description of them will not be given. The present invention is not limited to the embodiments and addition, deletion, and change can be made without departing from a spirit of the invention.

Embodiment 1

As shown in FIG. 1, an electric motorcycle 1 includes a front wheel 2 and a rear wheel 3. The front wheel 2 is rotatably mounted to a lower end portion of a front fork 4. The front fork 4 is coupled to a bar-type handle 5 via a steering shaft (not shown). The steering shaft is rotatably supported by a head pipe 7. A main frame 8 is mounted to the head pipe 7. The main frame 8 extends rearward and downward from the head pipe 7 and is positioned to extend along a center line in a vehicle width direction when viewed from above. The head pipe 7 is provided with a pair of down frames 9. The pair of down frames 9 extend downward while protruding outward in the vehicle width direction, from the head pipe 7, are bent, and then extend rearward.

A pivot frame 10 is provided at a rear lower end portion of the main frame 8 and rear end portions of the pair of down frames 9. The rear lower end portion is coupled to the rear end portions via the pivot frame 10. The pivot frame 10 is provided with a swing arm 11. A front end portion of the swing arm 11 is coupled to the pivot frame 10 such that the swing arm 11 is pivotable around the front end portion. The rear wheel 3 is rotatably mounted to a rear end portion of the swing arm 11. A rear wheel suspension 13 is mounted to the front end portion of the swing arm 11. The rear wheel suspension 13 is coupled to the rear end portion of the main frame 8. The rear wheel suspension 13 is mounted to the swing arm 11 and the main frame 8 such that the rear wheel suspension 13 is positioned between the swing arm 11 and the main frame 8. A seat rail 12 is provided at the rear end portion of the main frame 8. The seat rail 12 extends rearward and upward from a rear portion of the main frame 8. A driver straddle seat 14 is mounted over the seat rail 12. In front of the seat 14, a knee grip cover 15 is placed. The knee grip cover 15 is positioned between the seat 14 and the handle 15.

Figure 2:
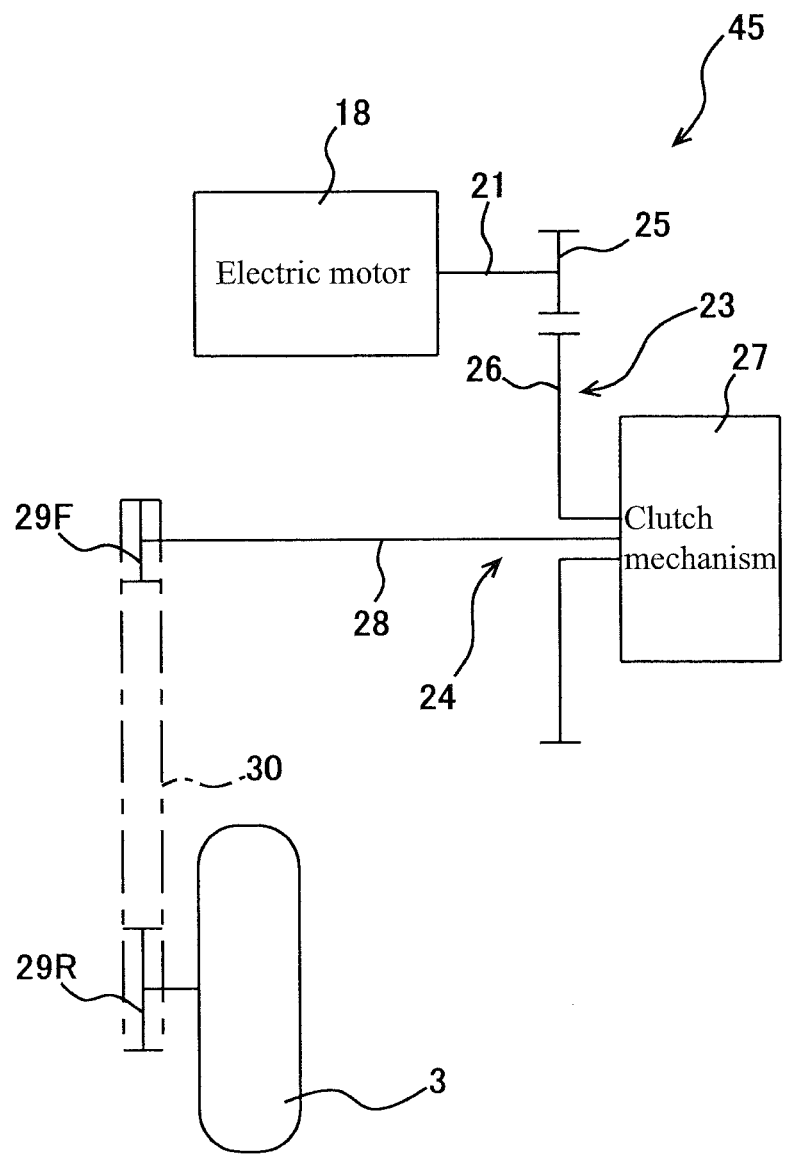
FIG. 2 is a block diagram schematically showing a configuration of the starting assist system according to Embodiment 1 of the present invention.

A controller 16 is accommodated into the knee grip cover 15. An electric motor case 17 is provided under the knee grip cover 15. The electric motor case 17 is mounted to the main frame 8 and the pair of down frames 9. An electric motor 18 is accommodated into the electric motor case 17. The electric motor 18 is, so-called three-phase AC motor, and is coupled to the rear wheel 3 which is a drive wheel, via a power transmission mechanism 23 as shown in FIG. 2.

Figure 3:
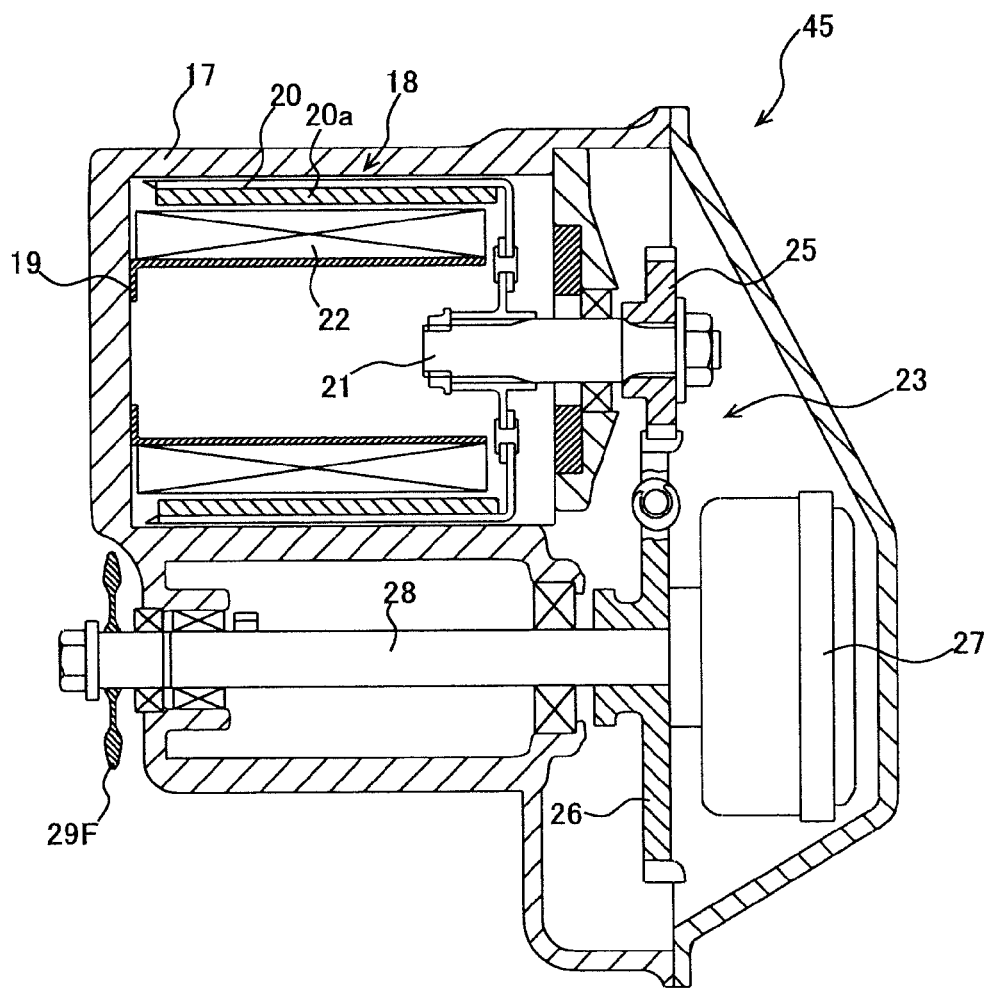
FIG. 3 is a cross-sectional view showing an electric driving unit in the starting assist system of FIG. 2.

As shown in FIG. 3, the electric motor 18 includes a stator 19, a rotor 20 and an output shaft 21. The stator 19 has a substantially cylindrical shape and is fastened to the electric motor case 17. The stator 19 has on its outer peripheral portion a plurality of electromagnetic coils 22, and a rotor 20 is provided around the electromagnetic coils 22. The rotor 20 is positioned to surround an outer peripheral portion of the stator 19 and has a plurality of permanent magnets 20a in locations corresponding to the electromagnetic coils 22, respectively. The rotor 20 is coupled to one end portion of an output shaft 21 which is rotatably supported on the electric motor case 17.

In the electric motor 18 configured as described above, when a current flows through the electromagnetic coils 22 of the stator 19, the rotor 20 rotates around the stator 19, thereby causing the output shaft 21 to rotate. The output shaft 21 rotating in this way is provided with the power transmission mechanism 23. The power transmission mechanism 23 is configured to transmit the rotational power of the output shaft 21 to the rear wheel 3 which is a drive wheel. The power transmission mechanism 23 constructs a power transmission path 24 (see FIG. 2) between the electric motor 18 and the rear wheel 3. The power transmission mechanism 23 includes an output gear 25 which is mounted on the other end portion of the output shaft 21.

A transmission gear 26 is in mesh with the output gear 25. The transmission gear 26 is attached with a clutch mechanism 27 which is a switching mechanism and a power transmission path disconnection mechanism. A drive shaft 28 extends from the clutch mechanism 27 in parallel with the output shaft 21. The clutch mechanism 27 is activated by a clutch driving mechanism 37 as will be described later to disconnect the transmission gear 26 and the drive shaft 28 from each other or connect them to each other. In other words, the clutch mechanism 27 is able to disconnect or connect a portion of the power transmission path 24.

Figure 4:
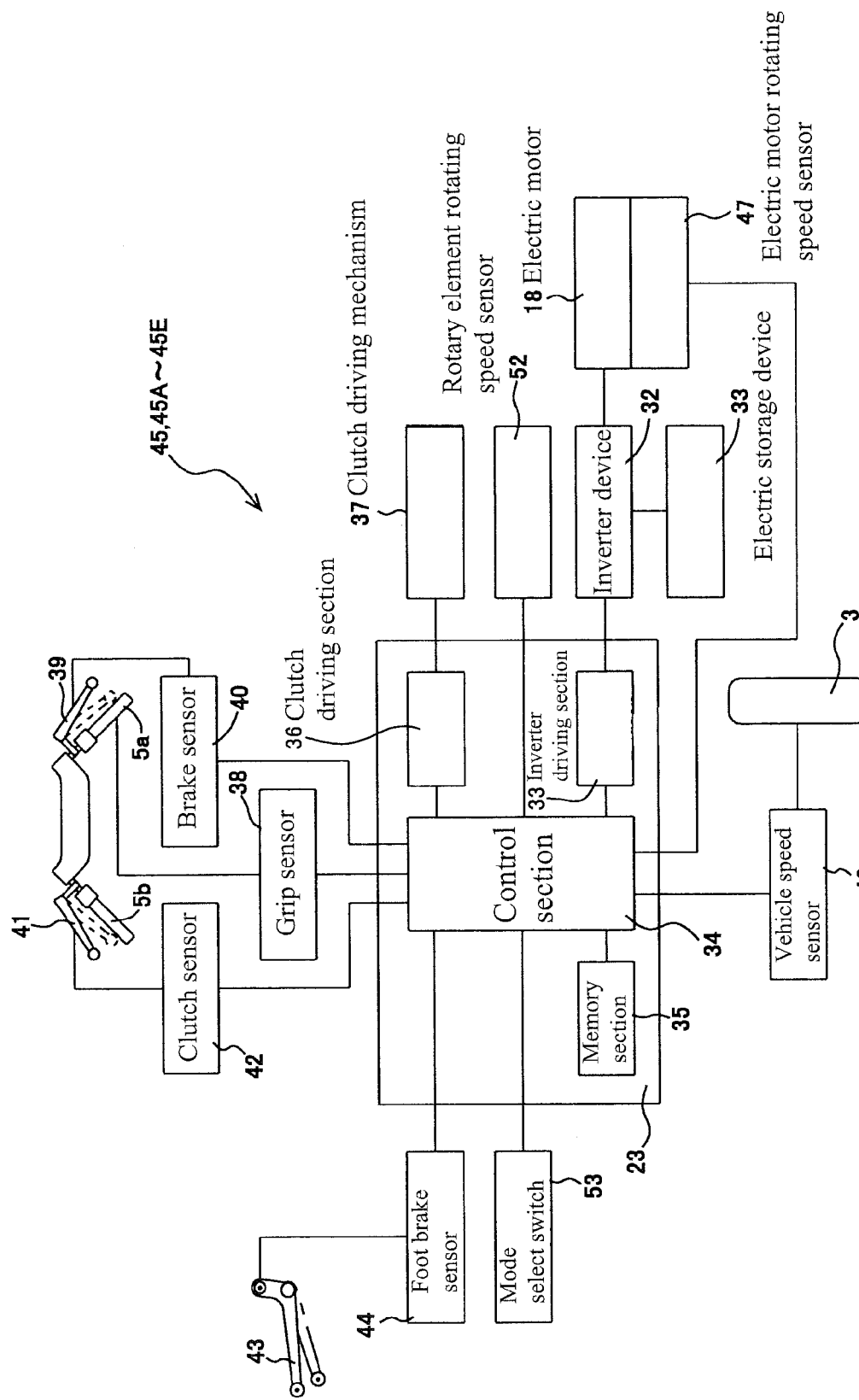
FIG. 4 is a block diagram showing an electric configuration of the starting assist system.

The drive shaft 28 is rotatably supported at two portions, i.e., a base end portion which is at the clutch mechanism 27 side, and a tip end portion. The tip end portion of the drive shaft 28 protrudes outward from the electric motor case 17. The tip end portion of the drive shaft 28 is provided with a motor sprocket 29F. The rear wheel 3 is provided with a rear wheel sprocket 29R. A power transmission member 30 such as a chain or a belt is wrapped around the two sprockets 29F and 29R. An electric driving unit 48 includes the electric motor 18 and the power transmission mechanism 23 configured as described above. The electric driving unit 48 is configured such that the electric motor 18 is supplied with the electric power to generate the rotational power (electric motor driving power) and the rotational power is transmitted to the rear wheel 3 via the power transmission mechanism 23. As shown in FIG. 4, an electric storage device 31 is connected to the electric motor 18. The electric motor 18 is supplied with the electric power from the electric storage device 31.

An inverter device 32 intervenes between the electric motor 18 and the electric storage device 31. The electric storage device 31 and the inverter device 32 are positioned between bent portions of the pair of down frames 9 (see FIG. 1). The electric storage device 31 is able to charge and discharge DC power. The inverter device 32 has an inverter function which converts the DC power discharged from the electric storage device 31 into three-phase AC power and supplies the three-phase AC power to the electric motor 18. The inverter device 32 is coupled to the controller 16. The controller 16 controls an operation of the inverter device 32.

The controller 16 has an inverter driving section 33 and a control section 34. The inverter driving section 33 is connected to the inverter device 32. The inverter driving section 33 is configured to activate the inverter device 32. The inverter driving section 33 is connected to the control section 34. The control section 34 which is an electric motor control device causes the inverter driving section 33 to control the operation of the inverter device 32. More specifically, the control section 34 performs PWM control for the inverter device 32 such that the AC power supplied to the electric motor 18 is adjusted by adjusting a frequency and voltage of the AC supplied to the electric motor 18, thereby adjusting a rotating speed of the electric motor 18.

The controller 16 includes a memory section 35 and a clutch driving section 36. The memory section 35 is connected to the control section 34 and is configured to store programs to be executed by the control section 34 and information to be sent to the control section 34. The clutch driving section 36 is connected to the control section 34 and to the clutch driving mechanism 37. The clutch driving mechanism 37 includes, for example, a linear motor and a cylinder mechanism and is configured to cause a plurality of clutch plates (not shown) in the clutch mechanism 27 to be apart from each other. In the clutch mechanism 27, the plurality of clutch plates are biased so as to contact each other in a pressurized manner. Thereby, a portion of the power transmission path 24 is connected. By activating the clutch driving mechanism 37, a force is exerted on the plurality of clutch plates in contact in a pressurized manner, in a direction to make them apart from each other. When the force exerted on the plurality of clutch plates exceeds a predetermined value, the portion of the power transmission path 24 is disconnected. The clutch driving section 36 is configured to drive the clutch driving mechanism 37. The control section 34 is configured to control an operation of the clutch driving section 36.

The control section 34 receives, via sensors, commands input by operation members attached on locations of the electric motorcycle 1, and determines whether or not conditions are satisfied based on the received commands. Hereinafter, the operation members attached on locations of the electric motorcycle 1 will be described with reference to FIGS. 4 and 5.

Figure 5:
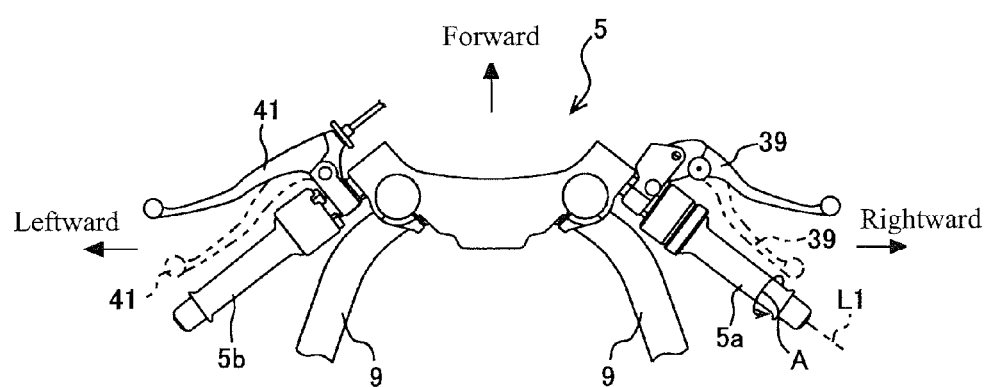
FIG. 5 is an enlarged plan view showing a region near a handle of the electric motorcycle of FIG. 1.

As shown in FIG. 5, a handle 5 which is a steering device has a pair of right and left grips 5a and 5b. The pair of grips 5a and 5b are provided at a right end portion and a left end portion of the handle 5, respectively. The right grip 5a is an accelerator grip by which an acceleration command (rotational power command) for acceleratively rotating the rear wheel 3 is input. The accelerator grip 5a which is an acceleration command input device is rotatable around an axis L1 along which the handle 5 extends, and is positioned in a grip reference position in a non-operated state. The accelerator grip 5a is applied with a biasing force for biasing the accelerator grip 5a in a predetermined direction (specifically, direction away from the driver, a direction opposite to a direction indicated by an arrow A, i.e., forward) toward the grip preference position. The accelerator grip 5a is rotatable in a direction (i.e., direction toward the driver, the direction indicated by the arrow A, rearward) opposite to the predetermined direction against the biasing force.

The accelerator grip 5a is provided with an accelerator grip sensor 38. The accelerator grip sensor 38 outputs an acceleration command corresponding to an angular displacement amount θ from the grip reference position. To be specific, accelerator grip sensor 38 outputs a command for increasing rotational power T with an increase in the angular displacement position. The accelerator grip sensor 38 is coupled to the control section 34 and provides the acceleration command to the control section 34. The control section 34 causes the inverter device 32 to adjust the electric power supplied to the electric motor 18 in response to the acceleration command. To be more specific, the control section 34 increases the rotational power of the electric motor 18 in response to the rotation of the accelerator grip 5a from the grip reference position toward the driver and decreases the rotational power of the electric motor 18 in response to returning of the accelerator grip 5a to the grip reference position.

A brake lever 39 is provided in front of the accelerator grip 5a. The brake lever 39 can be gripped together with the right grip 5a in a state in which the brake lever 39 is grabbed with fingers of the driver's right hand. By pulling the brake lever 39 toward the driver with the fingers of the driver's right hand grabbing the brake lever 39, the brake lever 39 is pivotable toward the driver (two-dotted line in FIG. 5) from the brake lever reference position (see solid line in FIG. 5). The brake lever 39 is applied with a biasing force for returning the brake lever 39 to the brake lever reference position. When the driver takes off the brake lever 39 in a state in which the brake lever 39 is pulled toward the driver, the brake lever 39 returns to the brake lever reference position.

The brake lever 39 is an operation member for activating a front wheel brake mechanism (not shown) provided for the front wheel 2. By pulling the brake lever 39 toward the driver, the front wheel brake mechanism is activated, to apply a mechanical braking force to the front wheel 2. By adjusting a displacement amount of the brake lever 39, the braking force applied to the front wheel 2 can be adjusted. The brake lever 39 having such a function is provided with a brake sensor 40. The brake sensor 40 is a switching sensor and is configured to detect whether or not the brake lever 39 has been operated. The brake sensor 40 is coupled to the control section 34 and provides a result of detection to the control section 34.

A clutch lever 41 is provided in front of the left grip 5b. The clutch lever 41 can be gripped together with the left grip 5b in a state in which the clutch lever 41 is grabbed with fingers of the driver's left hand. By pulling the clutch lever 41 toward the driver with the fingers of the driver's left hand grabbing the clutch lever 41, the clutch lever 41 is pivotable toward the driver (two-dotted line in FIG. 5) from the clutch lever reference position (see solid line in FIG. 5). The clutch lever 41 is applied with a biasing force for returning the clutch lever 41 to the clutch lever reference position. When the driver takes off the clutch lever 41 in a state in which the clutch lever 41 is pulled toward the driver, the clutch lever 41 returns to the clutch lever reference position.

The clutch lever 41 is a switching command input device by which the driver inputs an activation command (switching command) to activate the clutch mechanism 27. The clutch lever 41 is provided with a clutch sensor 42. The clutch sensor 42 is a position sensor and is configured to detect an operation amount of the clutch lever 41 and output an activation command indicating the operation amount. The clutch sensor 42 is coupled to the control section 34 and provides the activation command to the control section 34. Receiving the activation command, the control section 34 causes the clutch driving section 36 to activate the clutch driving mechanism 37 to generate a force corresponding to the activation command and exerted in a direction to move the plurality of clutch plates away from each other. When the force exerted on the clutch plates exceeds a predetermined value, a portion of the power transmission path 24 is disconnected. On the other hand, when the force exerted on the clutch plates becomes equal to or less than the predetermined value, the clutch plates of the clutch mechanism 27 which are away from each other are brought into contact each other in a pressurized manner, so that the portion of the power transmission path 24 is connected.

As shown in FIG. 4, the electric vehicle 1 includes a foot brake lever 43. The foot brake lever 43 is provided at a right side of a lower end portion of the pivot frame 10. The foot brake lever 43 allows a pastern of a right foot to be put thereon, and a toe of the right foot to be put on its tip end portion. The foot brake lever 43 is pivotable downward from a foot brake reference position (position in FIG. 1) by depressing the tip end portion of the brake lever 31 with the toe. The foot brake lever 43 is applied with a biasing force for returning the depressed foot brake lever 43 to the foot brake reference position.

The foot brake lever 43 is an operation member for activating a rear wheel brake mechanism (not shown) provided for the rear wheel 3. By depressing the tip end portion of the foot brake lever 43, the rear wheel brake mechanism is activated to apply a mechanical braking force to the rear wheel 3. By adjusting a displacement amount of the foot brake lever 43, the braking force applied to the rear wheel 3 can be adjusted. The foot brake lever 43 having such a function is provided with a foot brake sensor 44. The foot brake sensor 44 is a switching sensor and detects whether or not the foot brake lever 43 has been operated. The foot brake sensor 44 is coupled to the controller 16 and provides a result of detection to the controller 16.

The operation members and sensors arranged in locations construct a starting assist system 45 together with the controller 16, the electric motor 18, the power transmission mechanism 23, the clutch mechanism 27 and the clutch driving mechanism 37. The starting assist system 45 includes a vehicle speed sensor 46 and a rotating speed sensor 47 in addition to the above stated sensors. The vehicle speed sensor 46 is attached to the front wheel 2 and is configured to detect a speed of the front wheel 2, i.e., detect a speed of the electric motorcycle 1. The vehicle speed sensor 46 outputs a signal corresponding to the detected speed to the control section 34 of the controller 16. The rotating speed sensor 47 is attached to the output shaft 21 of the electric motor 18 and configured to detect a rotating speed of the output shaft 21. The rotating speed sensor 47 outputs a signal corresponding to the detected rotating speed to the control section 34 of the controller 16. The control section 34 detects a rotating speed of the rotor 20 based on the received signal.

In the starting assist system 45 configured as described above, during a stopped state of the electric motorcycle 1, the clutch mechanism 27 disconnects a portion of the power transmission path 24, and the electric motor 18 which is a rotary member is rotated so that the rotor 20 (upstream member) serving as a rotary element is rotated, and thereby a rotation energy is stored in the rotor 20. A circuit connected to the electromagnetic coils 22 constructs a closed loop, and the rotor 20 rotates by itself (independently), while preventing a braking force from being exerted on the rotor 20. In this way, after supplying of the electric power to the electric motor 18 is halted, the stored rotation energy can be kept in the rotor 20. Furthermore, during starting of the electric motorcycle 1, the clutch mechanism 27 connects a portion of the power transmission path 24, and thus, the stored rotation energy is transmitted as starting assist power to the rear wheel 3 together with the rotational power (electric motor driving power) of the electric motor 18, thereby allowing the electric motorcycle 1 to be started.

To select whether or not to generate the starting assist power, the starting assist system 45 is provided with a mode select switch 53. The mode select switch 53 is a push button switch, and is attached on, for example, the knee grip cover 15 or the handle 5. The mode select switch 53 is operated by the driver to input a select command used to select a starting assist mode in which the starting assist power is generated or a normal mode in which the starting assist power is not generated. The mode select switch 53 is coupled to the control section 34 and provides the select command to the control section 34. Based on the received select command, the control section 34 selects the starting assist mode or the normal mode.

Figure 6:
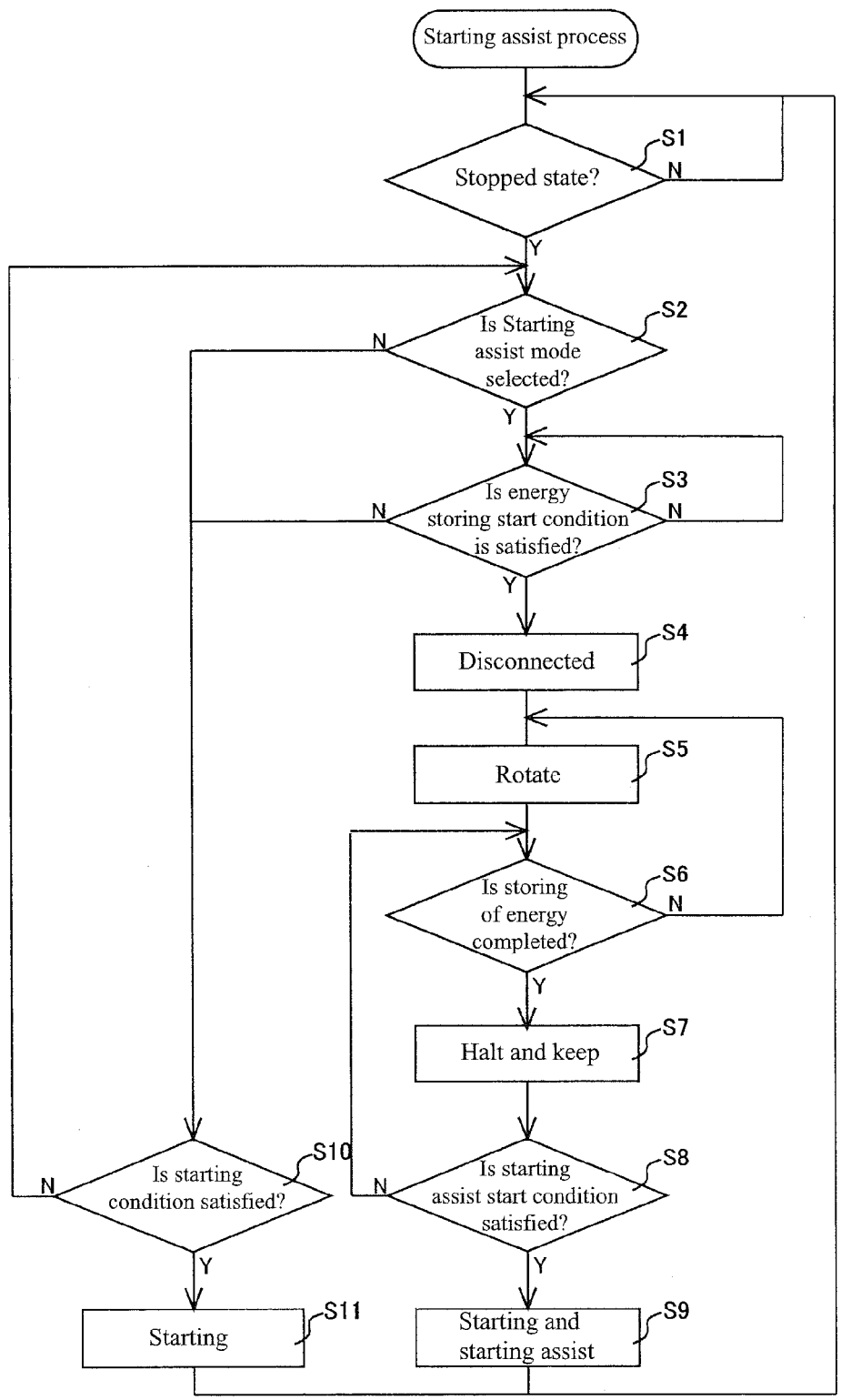
FIG. 6 is a flowchart showing a flow of a starting assist method which automatically stores rotation energy, in the starting assist system of FIGS. 2 to 4.

The starting assist system 45 executes a starting assist method, and is able to select the starting assist mode or the normal mode to select whether or not to generate the starting assist power. In the starting assist method, supplying of the electric power to the electric motor 18 is halted, to lessen electric power consumption in the electric motor 18 during the stopped state of the electric motorcycle 1, and thereafter, the electric motorcycle 1 is started again. In the starting assist method, there is a case where the rotation energy is stored automatically and a case where the rotation energy is stored manually. Hereinafter, the case where the rotation energy is stored automatically will be descried firstly with reference to FIG. 6, and then the case where the rotation energy is stored manually will be descried with reference to FIG. 7.

<Rotation Energy is Stored Automatically>

In the electric motorcycle 1, when a main switch (not shown) is turned ON, and a predetermined starting sequence is executed, a starting assist process starts. Thereupon, the process goes to step S1. In step S1 which is a stopped state determination step, the control section 34 determines whether or not the electric motorcycle 1 is in the stopped state based on a signal output from the vehicle speed sensor 46. If it is detected that the speed of the front wheel 2 is higher than a predetermined speed (e.g., 0 km) based on the signal output from the vehicle speed sensor 46, the control section 34 repeats the determination until it is detected that the speed of the front wheel 2 becomes equal to or lower than the predetermined speed. On the other hand, if it is detected that the speed of the front wheel 2 is equal to or lower than the predetermined speed (e.g., 0 km), the control section 34 determines that the electric motorcycle 1 is in the stopped state, and the process goes to step S2.

In step S2 which is a mode select determination step, the control section 34 determines whether the mode selected by the mode select switch 53 is the starting assist mode or the normal mode. If the control section 34 determines that the starting assist mode has been selected, the process goes to step S3. In step S3 which is an energy storing start condition determination step, the control sections 34 determines whether or not the energy storing start condition is satisfied. In the present embodiment, the energy storing start condition is such that the operation amount of the clutch lever 41 is greater than a predetermined value. The control sections 34 determines whether or not the energy storing start condition is satisfied, based on the activation command output from the clutch sensor 42. If the control section 34 determines that the energy storing start condition is satisfied, the process goes to step S4.

In step S4 which is a power transmission path disconnection step, the control section 34 causes the clutch driving section 36 to activate the clutch driving mechanism 37, to activate the clutch mechanism 27 in response to the operation amount of the clutch lever 41, thereby disconnecting a portion of the power transmission path 24. As a result, no driving power is transmitted from the electric motor 18 to the drive wheel 3. Thereby, the process goes to step S5.

In step S5 which is an energy storing step, the control section 34 supplies the electric power from the electric storage device 31 to the electric motor 18 via the inverter device 32. In the disconnected state, the rear wheel 3 does not rotate, but the rotary member, and the rotor 20 serving as the rotary element rotate, so that the rotation energy is stored in the rotor 20. After the electric power is supplied to the electric motor 18, the process goes to step S6. In step S6 which is an energy storing completion determination step, the control section 34 monitors the rotating speed of the rotor 20 based on the signal output from the rotating speed sensor 46, and determines whether or not an energy storing completion condition is satisfied. The energy storing completion condition is such that the rotating speed of the rotor 20 is greater than the predetermined value. If the control section 34 determines that the energy storing completion condition is not satisfied, the process returns to step S5, and the control section 34 continues to supply the electric power to the electric motor 18. On the other hand, if the control section 34 determines that the energy storing completion condition is satisfied, the process goes to step S7.

In step S7 which is an electric power supply halting step and is a rotation standby step, the control section 34 halts supplying of the electric power to the electric motor 18. After supplying of the electric power to the electric motor 18 is halted, a portion of the power transmission path 24 is disconnected. In this state, the rotor 20 rotates by itself, and the stored rotation energy is kept in the rotor 20. That is, the rotation energy stored in the stopped state is kept in the rotor 20. In this state, the process goes to step S8.

In step S8 which is a starting assist condition determination step, the control section 34 determines whether or not a starting assist condition is satisfied. The starting assist condition is such that the operation amount of the accelerator grip 5*a* is equal to or greater than a predetermined value based on an acceleration command output from the accelerator grip sensor 38. If the control section 34 determines that the starting assist condition is not satisfied, the process returns to step S6. On the other hand, if the control section 34 determines that the starting assist condition is satisfied, the process goes to step S9.

In step S9 which is a starting and starting assist step, the control section 34 causes the clutch driving section 36 to activate the clutch driving mechanism 37 to decrease the force exerted on the clutch plates, thereby causing the plurality of clutch plates to contact each other in a pressurized manner. Thereby, a portion of the power transmission path 24 is connected. In addition, the control section 34 supplies to the electric motor 18 the electric power corresponding to the acceleration command from the accelerator grip sensor 38, to rotate the output shaft 21. The rotational power of the output shaft 21 is transmitted to the rear wheel 3 via the connected power transmission path 24, thereby enabling the electric vehicle 1 to be started.

In the connected power transmission path 24, concurrently with the starting operation, the rotation energy stored in the rotor 20 is transmitted as the starting assist power to the rear wheel 3 via the power transmission mechanism 23. Thus, the starting assist power is transmitted to the rear wheel 3 together with the rotational power from the electric motor 18. The electric motorcycle 1 can be started by the starting assist power and the rotational power from the electric motor 18. After the electric motor 1 is started, the process returns to step S1.

Although the control section 34 causes the rotational power corresponding to the operation amount of the accelerator grip 5*a* to be generated, the control section 34 causes the inverter device 32 to control supplying of the electric power in step S9 so that a sum of the starting assist power and the rotational power generated by the electric motor 18 becomes the corresponding rotational power. This makes it possible to lessen the electric power consumption in the electric motor 18 as compared to a case where the starting assist power is not used.

If the control section 34 determines that the normal mode has been selected, in step S2, the process goes to step S10. If the control section 34 determines that the operation amount of the clutch sensor 41 is equal to or less than the predetermined value, in step S3, the process goes to step S10. In step S10 which is a starting condition determination step, the control section 34 determines whether or not a starting condition is satisfied. The starting condition is such that the accelerator grip 5*a* has been operated. The control section 34 determines whether or not the starting condition is satisfied based on the signal from the accelerator grip sensor 38. If the control section 34 determines that the starting condition is not satisfied, the process returns to step S2. On the other hand, if the control section 34 determines that the starting condition is satisfied, the process goes to step S11.

In step S11 which is a starting step, since the rotation energy is not stored in the rotor 20, the control section 34 causes the electric motor 18 to generate the rotational power corresponding to the operation amount of the accelerator grip 5*a*. Thus, the control section 34 drives the rear wheel 3 and starts the electric motorcycle 1 without using the starting assist power.

In the starting assist method in which the control section 34 executes the starting assist power generating operation to store the rotation energy automatically, the rotation energy is stored automatically in the rotor 20 by operating the clutch lever 41. Especially, because of step S3, the control section 34 can reflect the driver's intention to store the rotation energy. Specifically, in the case where the starting assist mode is selected, the driver can select starting using the starting assist power or starting without using the starting assist power. Or, in the case where the starting assist mode is selected, the starting assist may be executed without fail after stopping of driving of the electric motorcycle 1. In that case, the clutch lever 41 which commands the starting assist to be executed or non-executed may be omitted, and step S3 may be omitted.

In step S9, to prevent the starting assist power from working excessively, the starting assist power may be increased based on the rotating speed of the electric motor 18 or the vehicle speed of the electric motorcycle 1. In step S9, the starting assist power may be changed based on the operation amount of the clutch lever 41 or the accelerator grip 5*a*. This can also prevent the starting assist power from working excessively. Although in the present embodiment, the rotation energy is stored in the rotor 20 using the electric motor 18, during the stopped state of the electric motorcycle 1, the rotation energy may be stored in the rotor 20 when it is determined that the electric motorcycle 1 is decelerated, like Embodiment 2 as will be described later.

Next, a starting assist method in which the electric motor 18 is activated manually to manually store the rotation energy in the rotor 20 will be described. Note that the starting assist system 45 is configured to perform switching between the method of automatically storing the rotation energy and the method of manually storing the rotation energy, by using a switch (not shown).

<Rotation Energy is Stored Manually>

Figure 7:
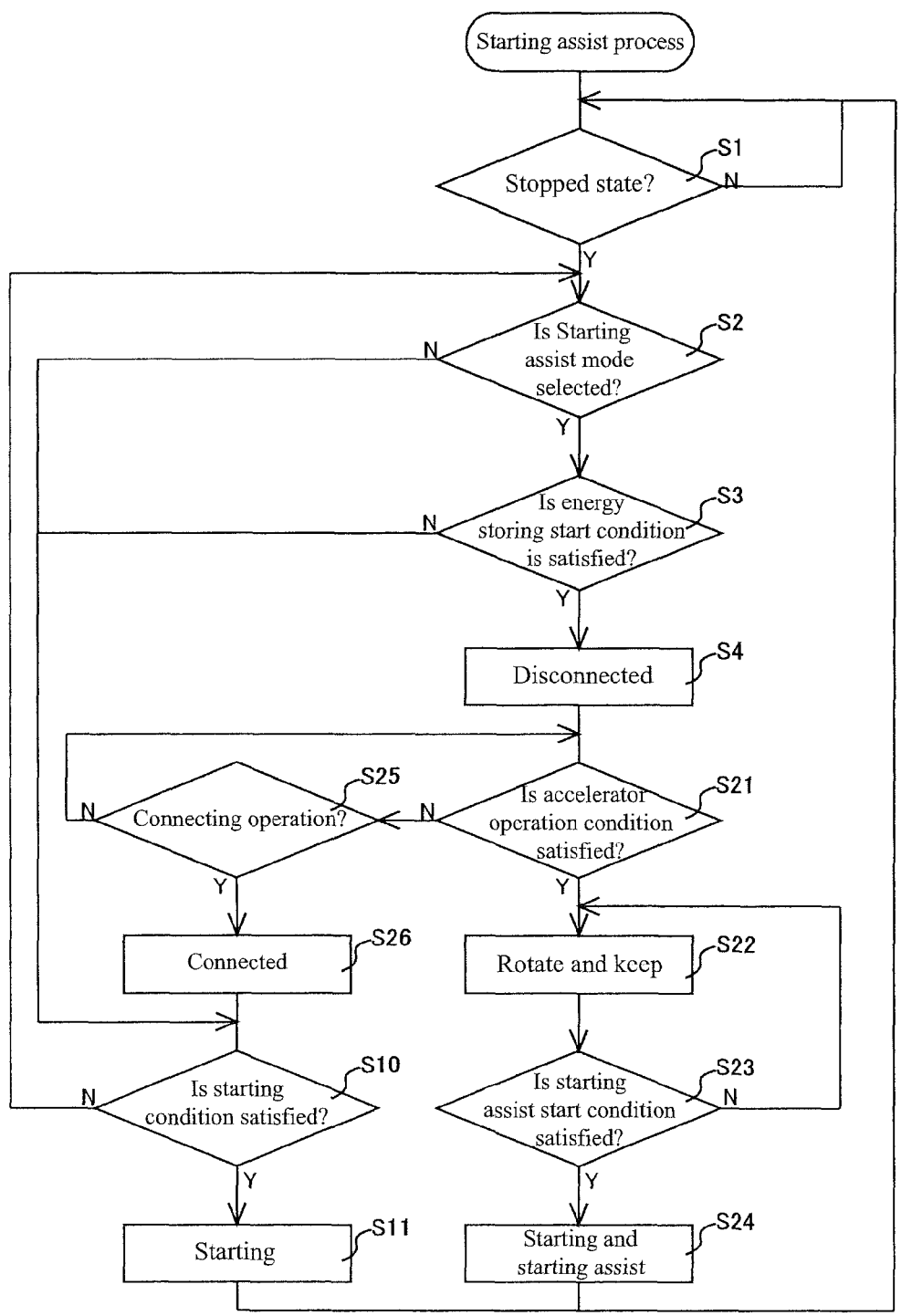
FIG. 7 is a flowchart showing a flow of a starting assist method which manually stores the rotation energy, in the starting assist system of FIGS. 2 to 4.

The method of automatically storing the rotation energy and the method of manually storing the rotation energy, are similar to each other in basic flowchart. Therefore, only differences between them will be described below. In the starting assist method in which the rotation energy is stored manually in the rotor 20, as shown in FIG. 7, when a portion of the power transmission path 24 is disconnected in step S4 which is the power transmission path disconnection step, the process goes to step S21. In step S21 which is an accelerator operation determination step, the control section 34 determines whether or not an accelerator operation condition (energy storing start condition) is satisfied based on the acceleration command output from the accelerator grip 38. The accelerator operation condition is such that an angular displacement amount θ which is output as the acceleration command is greater than a predetermined value. When the control section 34 determines that the accelerator operation condition is satisfied, the process goes to step S22.

In step S22 which is an energy storing step, the control section 34 supplies the electric power corresponding to the acceleration command, from the electric storage device 31 via the inverter device 32. Thereby, the rotary member and the rotor 20 serving as the rotary element rotate, and the rotation energy is stored in the rotor 20. In step S22 which is also a rotation standby step, a portion of the power transmission path 24 is disconnected. Thus, the braking force working with respect to the rotation of the rotor 20 can be reduced, and the rotor 20 rotates by itself and keeps the rotation energy stored therein after supplying of the electric power to the electric motor 18 is stopped as well as during supplying of the electric power to the electric motor 18. In this way, the stored rotation energy can be kept in the rotor 20 during the stopped state of the electric motorcycle 1. After the rotation energy is stored in the rotor 20, as described above, the process goes to step S23.

In step S23 which is a starting assist condition determination step, the control section 34 determines whether or not a starting assist condition is satisfied. The starting assist condition is such that the operation amount of the clutch lever 41 is equal to or less than a predetermined value based on the activation command output from the clutch sensor 42. If the control section 34 determines that the starting assist condition is not satisfied, the process returns to step S22. On the other hand, if the control section 34 determines that the starting assist condition is satisfied, the process goes to step S24.

In step S24 which is a starting assist step, the control section 34 causes the clutch driving section 36 to activate the clutch driving mechanism 37, and reduces the force exerted on the plurality of clutch plates in response to the operation amount of the clutch lever 41, thereby causing the plurality of clutch plates to contact each other in a pressurized manner. Thereby, a portion of the power transmission path 24 is connected. The control section 34 supplies the electric power corresponding to the acceleration command from the accelerator grip sensor 38 to the electric motor 18 to rotate the output shaft 21. The rotational power of the output shaft 21 is transmitted to the rear wheel 3 via the connected power transmission path 24, and thus, the electric vehicle 1 is started.

In the state in which a portion of the power transmission path 24 is connected, concurrently with the starting operation, the rotation energy stored in the rotor 20 is transmitted as starting assist power to the rear wheel 3 via the power transmission mechanism 23. Thus, the rotational power of the electric motor 18 and the starting assist power are transmitted to the rear wheel 3. The electric motorcycle 1 can be started by the rotational power of the electric motor 18 and the starting assist power. After that, the process returns to step S1. In step S24, as in step S9, the control section 34 controls supplying of the electric power to the inverter device 32 so that a sum of the starting assist power and the rotational power generated by the electric motor 18 is equal to the corresponding rotational power. This makes it possible to lessen the electric power consumption in the electric motor 18 as compared to a case where the starting assist power is not used.

In step S21, if the control section 34 determines that the accelerator operation condition is not satisfied, the process goes to step S25. In step S25 which is a connection operation determination step, the control section 34 determines whether or not the operation amount of the clutch lever 41 is equal to or less than a predetermined value based on the activation command output from the clutch sensor 42. If the control section 34 determines that the operation amount of the clutch lever 41 is greater than the predetermined value, the process goes to step S21. On the other hand, if the control section 34 determines that the operation amount of the clutch lever 41 is equal to or less than the predetermined value, the process goes to step S26. In step S26 which is a power transmission path connection step, the control section 34 causes the clutch driving section 36 to activate the clutch driving mechanism 37, to activate the clutch mechanism 27, thereby connecting a portion of the power transmission path 24. After a portion of the power transmission path 24 is connected, the process goes to step S10.

In the starting assist system 45 of the present embodiment configured as described above, since supplying of the electric power to the electric motor 18 is halted and the rotation of the output shaft 21 is stopped during a certain period in the stopped state of driving, electric power consumption can be lessened during the stopped state. By comparison, since the rotation energy stored in the rotor 20 is transmitted to the rear wheel 3 as the starting assist power, the rotational power required to start the electric motorcycle 1 can be attained from the rotational power generated by the electric motor 18 and the starting assist power from the rotor 20. Therefore, the rotational power to be generated by the electric motor 18 can be reduced during starting, and the electric power required to start the electric motorcycle 1 can be reduced. In the electric motorcycle 1, a battery capacity is smaller and the output of the electric motor 18 is smaller as compared to automobile. Because of this, the starting assist system 45 which is able to lessen electric power consumption and attain rotational power of a great magnitude during starting is effectively employed in the electric motorcycle 1.

In the starting assist system 45, a portion of the power transmission path 24 is disconnected by the clutch mechanism 27, the electric power is supplied to the electric motor 18 during at least a period other than a period during which supplying of the electric power to the electric motor 18 is halted, in the stopped state of the electric motorcycle 1, the rotation energy can be stored in the rotor 20, and the stored rotation energy can be used to start the electric motorcycle 1. In this configuration, initial rotational power to be generated by the electric motor 18 is greater in a case where the power transmission path between the stopped front wheel 3 and the electric motor 18 is disconnected than in a case where the power transmission path is connected. In addition, since a weight of the rotor 20 is smaller relative to a weight of the entire power transmission path 24, required initial rotational power is smaller in the case where the rotor 20 is rotated than in a case where the rear wheel 3 is rotated. Because of this, instantaneous electric power supplied to the electric motor 18 for initial motion can be lessened by storing the rotation energy in the rotor 20, and as a result the electric power consumption during starting can be lessened.

In the starting assist system 45, in the case where the rotation energy is stored automatically, the rotation energy is stored automatically in the rotor 20 when the energy storing start condition is satisfied, while supplying of the electric power to the electric motor 18 is halted automatically when the energy storing completion condition is satisfied, and storing of the energy finishes. This makes it possible to prevent a situation in which the electric power continues to be supplied to the electric motor 18 and thereby electric power consumption increases, during the stopped state. By comparison, in the case where the rotation energy is stored manually, the driver can adjust the amount of the stored rotation energy according to a situation.

In the starting assist system 45, when the normal mode is selected, it is possible to prevent the electric power from being supplied to the electric motor 18, for example, in a case where the electric consumption in the electric motor 18 during starting is less, i.e., the starting assist power is unnecessary, like a case where the electric motorcycle 1 is going to start on a downward slope. In the starting assist system 45, when the accelerator grip 5a is operated without operating the clutch lever 41, the electric motorcycle 1 can be started without using the starting assist power. Thus, whether or not to attain the starting assist power can be selected merely by operating the clutch lever 41.

Embodiment 2

Figure 8:
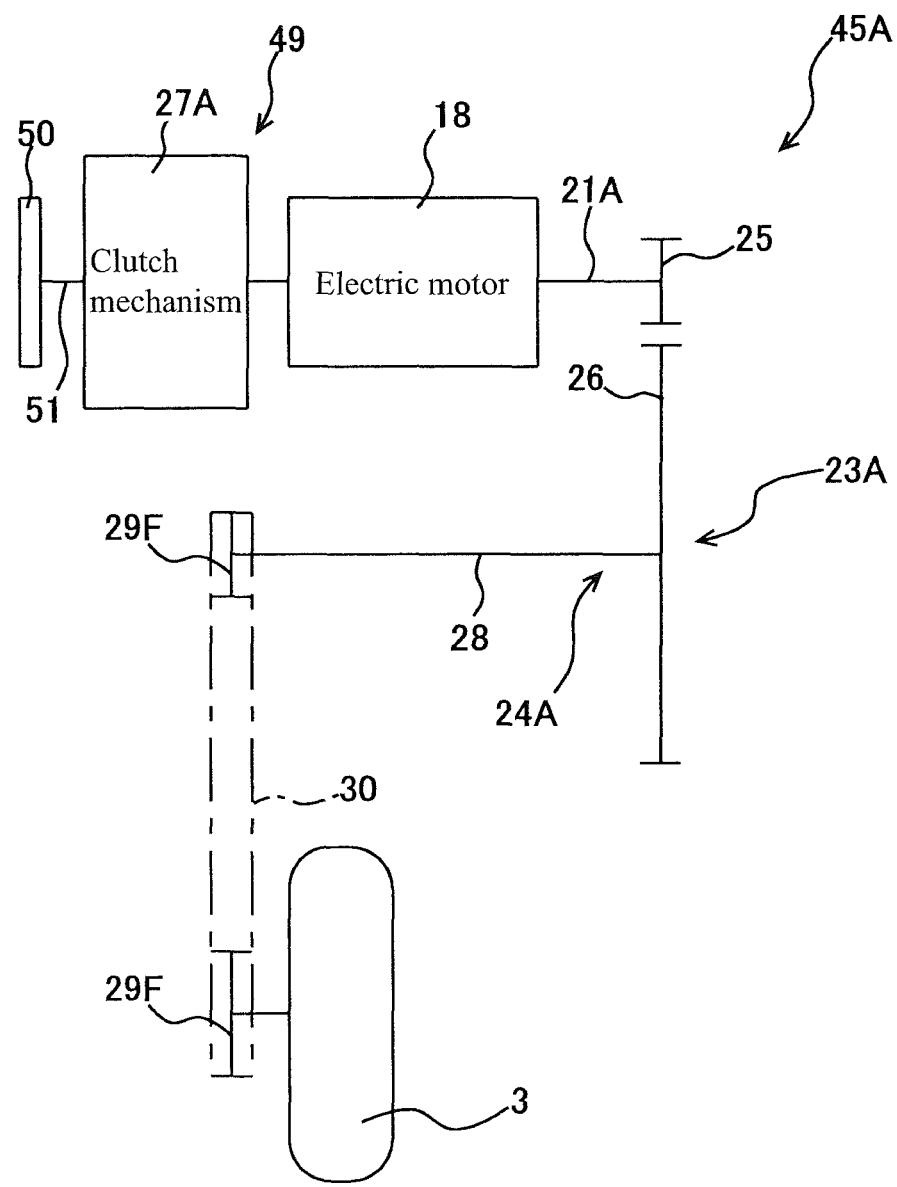
FIG. 8 is a block diagram schematically showing a configuration of a starting assist system according to Embodiment 2 of the present invention.

In a starting assist system 45A according to Embodiment 2 of the present invention, as shown in FIG. 8, a clutch mechanism 27A is placed on a starting assist power transmission path 49 which branches from a power transmission mechanism 24A, rather than on the power transmission path 24A. The starting assist power transmission path 49 is provided with a disc-shaped rotary element 50 which is rotatable and is connected to the rear wheel 3 via the starting assist power transmission path 49 and the power transmission path 24. Hereinafter, regarding a specific configuration of the starting assist system 45A, differences from the starting assist system 45 of Embodiment 1 will be mainly described.

Figure 9:
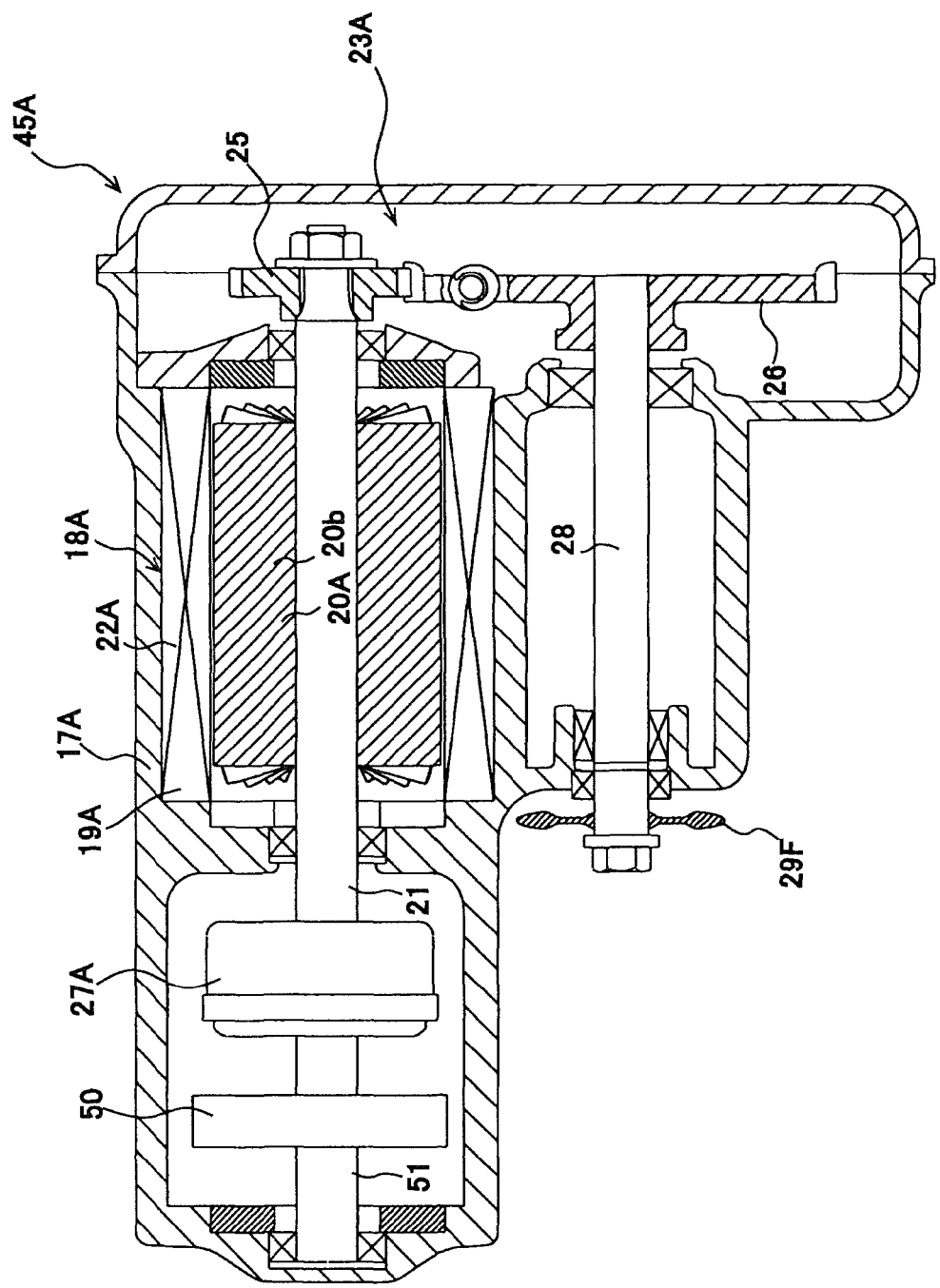
FIG. 9 is a cross-sectional view showing an electric driving unit in the starting assist system of FIG. 8.

As shown in FIG. 9, in the starting assist system 45A, the electric motor 18 includes a stator 19A, a rotor 20A and an output shaft 21A. The stator 19A has a substantially cylindrical shape and is fastened to an electric motor case 17A. The stator 19A has on its inner peripheral portion a plurality of electromagnetic coils 22A. The rotor 20A is inserted into the plurality of electromagnetic coils 22A. That is, the stator 19A is positioned to surround an outer peripheral portion of the rotor 20A. The rotor 20A has a plurality of permanent magnets 20b. The output shaft 21A penetrates centers of the permanent magnets 20b.

One end portion of the output shaft 21A and the other end portion of the output shaft 21A are supported on the electric motor case 17A such that the output shaft 21A is rotatable. A clutch mechanism 27A is attached to one end portion of the output shaft 21A. A clutch shaft 51 extends from the clutch mechanism 27A coaxially with the output shaft 21A. A tip end portion of the clutch shaft 51 is supported on the electric motor case 17A such that the clutch shaft 51 is rotatable.

A disc-shaped rotary element 50 is fastened to the clutch shaft 51 and is rotatable together with the clutch shaft 51. A rotary element rotating speed sensor 52 (see FIG. 4) is attached on the rotary element 50. The rotary element rotating speed sensor 52 is coupled to the control section 34. The rotary element rotating speed sensor 52 detects a rotating speed of the rotary element 50 and provides the detected rotating speed to the control section 34.

A power transmission mechanism 23A is mounted to the other end portion of the output shaft 21A. The power transmission mechanism 23A constitutes the power transmission path 24A connecting the electric motor 18A to the rear wheel 3.

In the starting assist system 45A configured as described above, the starting assist power transmission path 49 which branches from the power transmission path 24A is constituted by the one end portion of the output shaft 21A and the clutch shaft 51. In the starting assist power transmission path 49, the clutch mechanism 27A is able to provide connection or disconnection between the output shaft 21A and the clutch shaft 51 (i.e., disconnects or connects a portion of the starting assist power transmission path 49). In the starting assist system 45, by connecting a portion of the starting assist power transmission path 49 during driving when the rear wheel 3 is rotating, the rotational power of the output shaft 21A which is a rotary member is transmitted to the rotary element 50 via the clutch shaft 51, and the rotation energy is stored in the rotary element 50.

Figure 10:
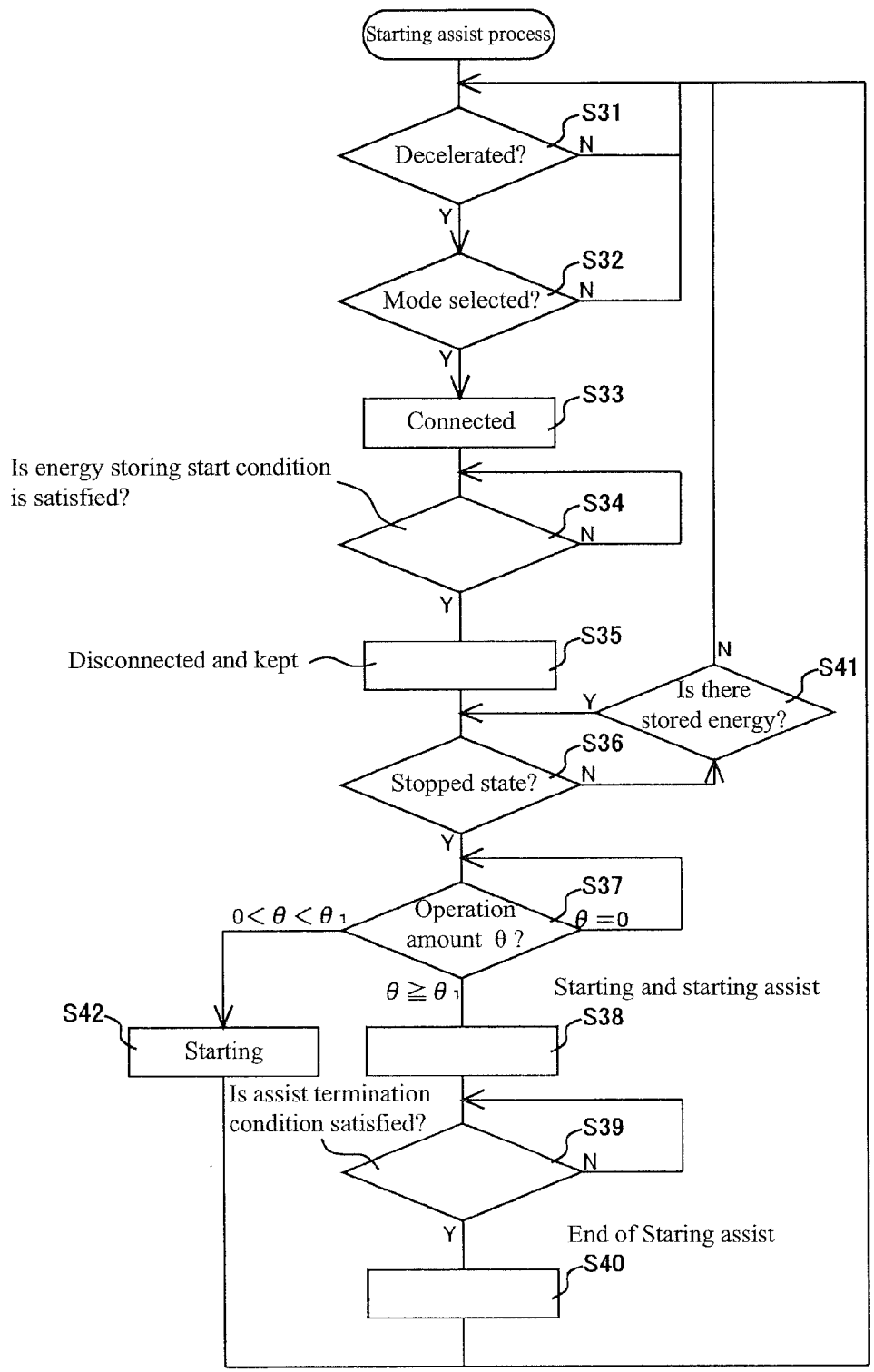
FIG. 10 is a flowchart showing a flow of a starting assist method in the starting assist system of FIG. 8.

In the starting assist system 45A, by disconnecting a portion of the starting assist power transmission path 49 in a state in which the rotation energy is stored in the rotary element 50, the rotation energy stored in the rotary element 50 is kept there. During starting, by connecting a portion of the starting assist power transmission path 49, the rotation energy stored and kept in the rotary element 50 can be transmitted as the starting assist power to the rear wheel 3. The starting assist system 45A executes a starting assist method for generating the starting assist power in this way. Hereinafter, the starting assist method executed by the starting assist system 45A will be specifically described with reference to FIG. 10.

In the electric motorcycle 1, when a main switch (not shown) is turned ON, and a predetermined starting sequence is executed, a starting assist process starts. Thereupon, the process goes to step S31. At this time, a portion of the starting assist power transmission path 49 is disconnected by the clutch mechanism 27A. In step S31 which is a deceleration state determination step, the control section 34 determines whether or not the electric motorcycle 1 is decelerated. The control section 34 determines that the electric motorcycle 1 is decelerated, when a driving speed of the electric motorcycle 1 is equal to or higher than a predetermined speed and at least one of the brake lever 39 and the foot brake lever 43 has been operated. The control section 34 determines whether or not the electric motorcycle 1 is decelerated based on a signal output from the vehicle speed sensor 46, a signal output from the brake sensor 40, and a signal output from the foot brake sensor 44. If the control section 34 determines that the electric motorcycle 1 is not decelerated, the control section 34 repeats the determination until it is detected that the electric motorcycle 1 is decelerated. After it is detected that the electric motorcycle 1 is decelerated, the process goes to step S32.

In step S32 which is a mode select determination step, the control section 34 determines whether the mode selected by the mode select switch 53 is the starting assist mode or the normal mode. If the control section 34 determines that the normal mode has been selected, the process returns to step S31. On the other hand, if the control section 34 determines that the starting assist mode has been selected, the process goes to step S33. In step S33 which is an energy storing step, the control section 34 causes the clutch driving section 36 to activate the clutch driving mechanism 37, to activate the clutch mechanism 27A to connect a portion of the starting assist power transmission path 49. In the connected state, the rotational power of the output shaft 21A is transmitted to the rotary element 50 via the clutch shaft 51 and the rotational energy is stored in the rotary element 50. After a portion of the starting assist power transmission path 49 is connected, the process goes to step S34.

In step S34 which is a disconnection condition satisfaction determination step, the control section 34 determines whether or not an energy storing completion condition is satisfied. The energy storing completion condition is such that the rotating speed of the rotary element 50 is equal to or less than a predetermined rotating speed. The control section 34 repeats the determination until the rotating speed of the rotary element 50 becomes equal to or less than the predetermined value, based on the signal output from the vehicle speed sensor 46. When the control section 34 determines that the rotating speed of the rotary element 50 becomes equal to or less than the predetermined value, and the energy storing completion condition is satisfied, the process goes to step S35.

In step S35 which is a rotation standby step, the control section 34 causes the clutch driving section 36 to activate the clutch driving mechanism 37, to activate the clutch mechanism 27A, thereby disconnecting a portion of the starting assist power transmission path 49. Thereby, the rotary element 50 rotates by itself, and the rotation energy stored in the rotary element 50 in the energy storing step can be kept there. After a portion of the starting assist power transmission path 49 is disconnected, the process goes to step S36.

In step S36 which is a stopped state determination step, the control section 34 determines whether or not the electric motorcycle 1 is in the stopped state based on a signal output from the vehicle speed sensor 46. If it is detected that the speed of the front wheel 2 is equal to or lower than a predetermined speed (e.g., 0 km), the control section 34 determines that the electric motorcycle 1 is in the stopped state, and the process goes to step S37. In step S37 which is a starting assist condition determination step, the control section 34 determines whether or not a starting assist condition and a non-assist condition are satisfied. The starting assist condition and the non-assist condition are set according to the angular displacement amount θ of the accelerator grip 5a. The starting assist condition is such that the angular displacement amount θ is equal to or greater than a predetermined angular displacement amount $θ_1$. The non-assist condition is such that the angular displacement amount θ is greater than zero and smaller than the predetermined angular displacement amount $θ_1$. When it is detected that the angular displacement amount θ is zero based on the acceleration command from the accelerator grip sensor 38, the control section 34 determines that the starting assist condition and the non-assist condition are not satisfied, and repeats the determination until one of the conditions is satisfied. When it is detected that the angular displacement amount θ is equal to or greater than the predetermined angular displacement amount $θ_1$, the control section 34 determines that the starting assist condition is satisfied, and the process goes to step S38.

In step S38 which is a starting step and a starting assist step, the control section 34 causes the inverter driving section 33 to activate the inverter device 32, to supply the electric power corresponding to the operation amount of the accelerator grip 5a to the electric motor 18A, thereby rotating the output shaft 21A. Thus, the rotational power of the output shaft 21A is transmitted to the rear wheel 3 via the power transmission mechanism 23A, and the electric motorcycle 1 is started. Concurrently with the starting operation, the control section 34 causes the clutch driving section 36 to activate the clutch driving mechanism 37, thereby causing the plurality of clutch plates to contact each other in a pressurized manner. Thereby, a portion of the starting assist power transmission path 49 is connected. The rotation energy stored in the rotary element 50 is transmitted as the starting assist power to the rear wheel 3 via the power transmission mechanism 23. After a portion of the starting assist power transmission path 49 is connected and the starting assist power is transmitted to the rear wheel 3, the process goes to step S39.

In step S39 which is an assist termination condition determination step, the control section 34 determines whether or not an assist termination condition is satisfied. The assist termination condition is such that the speed of the electric motorcycle 1 is higher than a predetermined disconnection speed. Note that the disconnection speed is set smaller than the above stated predetermined speed. If it is detected that the speed of the front wheel 2 is equal to or lower than the disconnection speed based on the signal from the vehicle speed sensor 46, the control section 34 repeats determination until the speed of the front wheel 2 becomes higher than the disconnection speed. If the control section 34 determines that the speed of the front wheel 2 becomes higher than the disconnection speed, the process goes to step S40.

In step S40 which is a starting assist termination step, the control section 34 causes the clutch driving section 36 to activate the clutch driving mechanism 37A, to activate the clutch mechanism 27, thereby disconnecting a portion of the starting assist power transmission path 49. This can prevent the rotary element 50 from imposing a load on the electric motor 18 during driving or acceleration. After a portion of the starting assist power transmission path 49 is disconnected, the process returns to step S31.

In step S36, if the control section 34 determines that the electric motorcycle 1 is not in the stopped state, the process goes to step S41. In step S41, the control section 34 determines whether or not the rotating speed of the rotary element 50 is greater than a predetermined value by using the rotary element rotating speed sensor 52. This predetermined value is set smaller than the predetermined rotating speed used in determination in step S34. Thus, the rotation energy stored in the rotary element 50 is monitored. If the control section 34 determines that the rotating speed of the rotary element 50 is greater than the predetermined value, the process returns to step S36. On the other hand, if the control section 34 determines that the rotating speed of the rotary element 50 is equal to or less than the predetermined value, the process returns to step S31.

If it is detected that the angular displacement amount θ is greater than zero and smaller than the predetermined angular displacement amount $θ_1$, based on the command from the accelerator grip sensor 38, in step S37, the control section 34 determines that the non-starting assist condition is satisfied, and the process goes to step S42. In step S42 which is a starting step, the control section 34 causes the inverter driving section 33 to activate the inverter device 32, to supply the electric power corresponding to the operation amount of the accelerator grip 5a to the electric motor 18A, thereby rotating the output shaft 21A. Thus, the rotational power of the output shaft 21A is transmitted to the rear wheel 3 via the power transmission mechanism 23A, and the electric motorcycle 1 is started. At this time, a portion of the starting assist power transmission path 49 remains disconnected.

The starting assist system 45A of the present embodiment configured as described above has advantages as described below, in addition to the advantages achieved by the starting assist system 45 of Embodiment 1. The rotation energy is stored in the rotary element 50 during driving of the electric motorcycle 1, the stored rotation energy is kept during the stopped state of the electric motorcycle 1, and the rotation energy is used as the starting assist power during starting of the electric motorcycle 1. This, the rotation energy during driving can be efficiently used, and the electric power consumption in the electric motor 18 can be lessened.

In the starting assist system 45A, during deceleration of the electric motorcycle 1, the output shaft 21A and the rotary element 50 are coupled together and rotated together. Thereby, the rotation energy of the rear wheel 3 is stored in the rotary element 50 and rear wheel 3 is decelerated. That is, since a portion of the energy converted into brake heat or the like and lost during deceleration is recovered as the rotation energy, electric power consumption in the electric motor 18 during starting can be lessened.

In the starting assist system 45A, in the rotation standby step, the electric motorcycle 1 can drive in the state in which the rotation energy is kept in the rotary element. When the rotation energy of the rotary element is running short in the middle of driving, the rotary member and the rotary element are coupled together so that the rotation energy can be restored in the rotary element.

In the starting assist system 45A, when the starting assist termination condition is satisfied, a portion between the rotary member and the rotary element is disconnected. This allows the rotational power of the electric motor 18 for rotating the rotary element 50 to be used to accelerate the rear wheel 3 especially during acceleration. As a result, the electric power consumption in the electric motor during driving can be lessened.

In the starting assist system 45, in a case where the angular displacement amount θ of the accelerator grip 5a is great and the rotational power of a great magnitude is necessary, the starting assist power can be applied to the rear wheel 3. On the other hand, in a case where the angular displacement amount θ of the accelerator grip 5a is small and the rotational power of a great magnitude is not necessary, the starting assist power can be kept. Since whether or not to use the starting assist power can be selected according to a situation, convenience can be improved.

In the starting assist system 45, since a portion of the starting assist power transmission path 49 is connected automatically when the starting assist condition is satisfied, the starting assist power can be attained without a need for the operation of the clutch lever 41. Therefore, the starting assist power can be attained without operating the clutch lever 41. Thus, the driver's operation is easy.

Since the rotary element 50 is placed at an opposite side of the output shaft 21A of the electric motor 18A in Embodiment 2, the clutch mechanism 27A and the rotary element 50 can be placed without interference with the output shaft 21A and the gears 25 and 26. Thus, the components can be laid out easily and space saving can be achieved.

Although whether or not to execute the starting assist is determined based on a magnitude of the operation amount of the accelerator grip 5a in Embodiment 2, the starting assist may be executed without fail in the case where the starting assist mode is selected as described in Embodiment 1. In that case, the operation for detecting the operation amount of the accelerator grip 5a to detect whether or not to execute the starting assist is unnecessary, and the process may go to step S38 when it is determined YES in step S36. If the mode is not selected in step S32, the electric power corresponding to the operation amount of the accelerator grip 5a is supplied without storing the rotation energy in the rotary element 50.

In step S38, to prevent the starting assist power from working excessively, the starting assist power may be increased based on the rotating speed of the electric motor 18 or the vehicle speed of the electric motorcycle 1. In step S39, the starting assist power may be changed based on the operation amount of the clutch lever 41 or the operation amount of the accelerator grip 5a. This can also prevent the starting assist power from working excessively.

Embodiment 3

Figure 11:
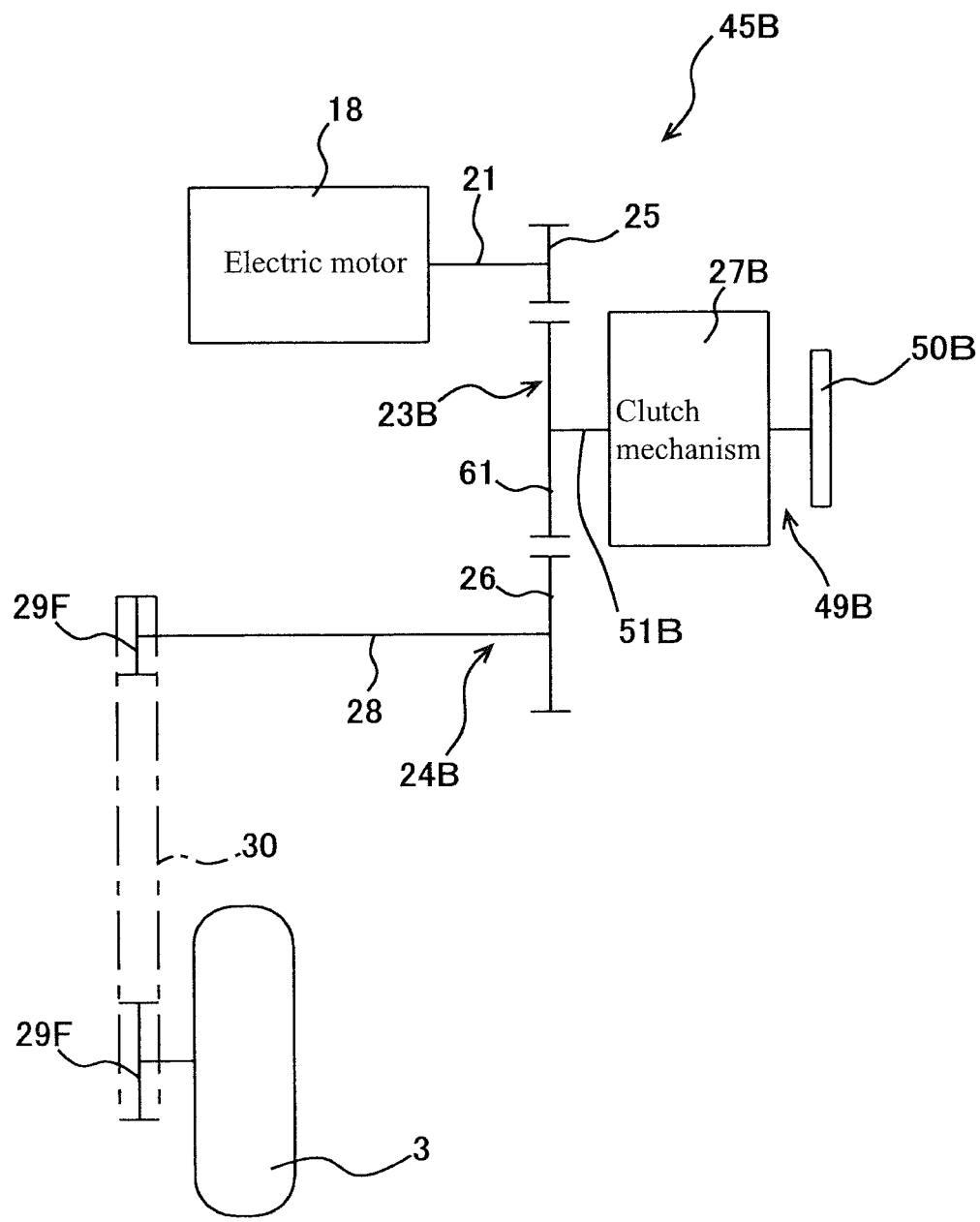
FIG. 11 is a block diagram schematically showing a configuration of a starting assist system according to Embodiment 3 of the present invention.

As shown in FIG. 11, a starting assist system 45B according to Embodiment 3 of the present invention is similar to the starting assist system 45A according to Embodiment 2. A coupling gear 61 intervenes between an output gear 25 and a transmission gear 26 in a power transmission path 24B. The coupling gear 61 included in a power transmission mechanism 23B is in mesh with the output gear 25 and the transmission gear 26 and is rotatable together with the output gear 25 and the transmission gear 26. The coupling gear 61 which is a rotary member is provided with a clutch mechanism 27B. A clutch shaft 51B extends from the clutch mechanism 27B such that it branches from the power transmission path 24B. A rotary element 50B is fastened to the clutch shaft 51B. The clutch mechanism 27B and the clutch shaft 51B construct a starting assist power transmission path 49B which branches from the power transmission path 24B, and is configured to disconnect or connect a portion of the starting assist power transmission path 49B.

In the starting assist system 45B according to Embodiment 3, the clutch mechanism 27B connects a portion of the starting assist power transmission path 49B to store the rotation energy in the rotary element 50, during driving, while the clutch mechanism 27B disconnects a portion of the starting assist power transmission path 49B to keep the rotation energy. By re-connecting a portion of the starting assist power transmission path 49B, the kept rotation energy can be transmitted as the starting assist power to the rear wheel 3, thus assisting starting of the electric motorcycle 1.

The starting assist system 45B according to Embodiment 3 configured as described above is able to assist starting of the electric motorcycle 1 by the starting assist method similar to that executed in the starting assist system 45A according to Embodiment 2.

Embodiment 4

Figure 12:
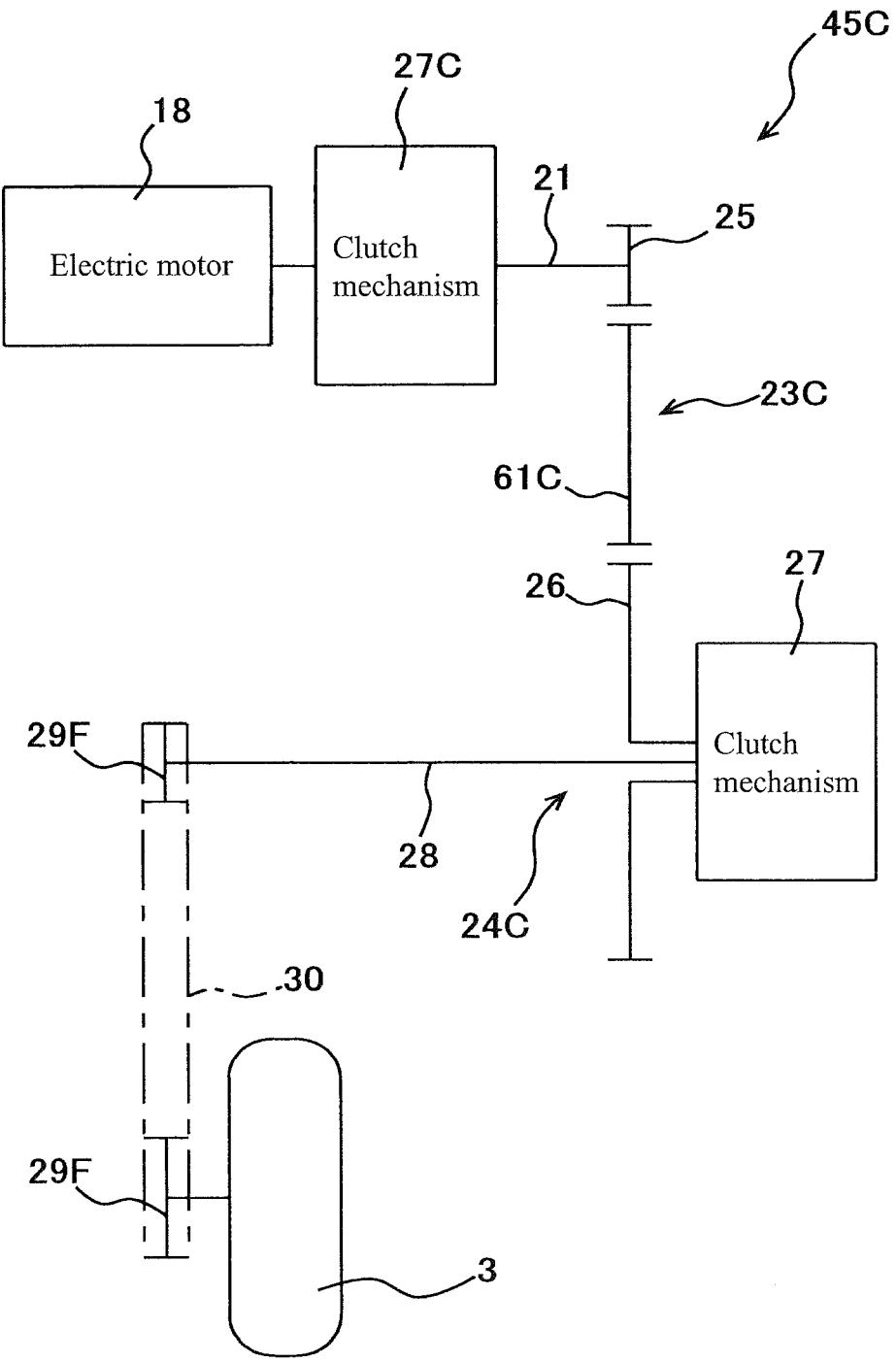
FIG. 12 is a block diagram schematically showing a configuration of a starting assist system according to Embodiment 4 of the present invention.

As shown in FIG. 12, a starting assist system 45C according to Embodiment 4 of the present invention is similar to the starting assist system 45 according to Embodiment 1. A coupling gear 61C intervenes between an output gear 25 and a transmission gear 26 in a power transmission path 24B and is in mesh with them. The coupling gear 61C included in a power transmission mechanism 23C is rotatable together with the output gear 25 and the transmission gear 26, and serves as a rotary element which is able to store the rotation energy therein. The power transmission path 24C in the starting assist system 45C is provided with a clutch mechanism 27C in addition to the clutch mechanism 27. The clutch mechanism 27C is attached on to the output shaft 21. A clutch shaft 51C extends from the clutch mechanism 27C along an extended line of the output shaft 21, and the output gear 25 is fastened to a tip end portion of the clutch shaft 51C.

The starting assist system 45C according to Embodiment 4 configured as described above is able to store the rotation energy by executing both of the starting assist method executed by the starting assist system 45 according to Embodiment 1 and the starting assist method executed by the starting assist system 45A according to Embodiment 2. In addition, in the rotation standby step, the clutch mechanism 27C disconnects a portion of the power transmission path 24C, thereby preventing a situation in which the rotation energy stored in the coupling gear 61C which is the rotary element, the output gear 25 and the transmission gear 26, is lost by a rotating resistance (sliding resistance) in the electric motor 18. This can suppress an energy loss which would be generated before the rotation energy stored in the rotary element is applied to the rear wheel 2 as the starting assist power.

Embodiment 5

Figure 13:
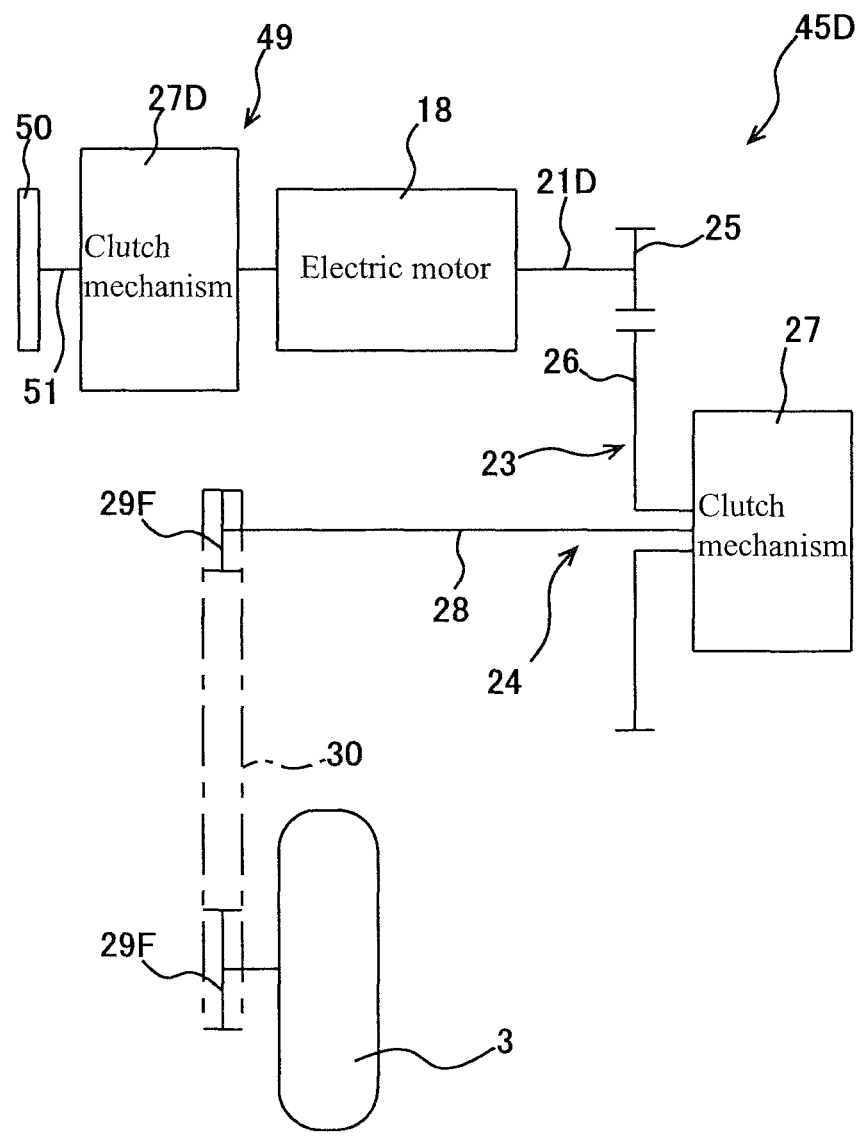
FIG. 13 is a block diagram schematically showing a configuration of a starting assist system according to Embodiment 5 of the present invention.

As shown in FIG. 13, a starting assist system 45D according to Embodiment 5 of the present invention is similar to the starting assist system 45 according to Embodiment 1, and is a combination of the starting assist system 45 according to Embodiment 1 and the starting assist system 45 according to Embodiment 2. Specifically, a clutch mechanism 27D is attached to one end portion of an output shaft 21D of an electric motor 18D. A rotary element is fastened to a tip end portion of a clutch shaft 51B extending from the clutch mechanism 27D, and is rotatable together with the clutch shaft 51.

In the starting assist system 45D configured as described above, the clutch mechanism 27 disconnects a portion of the power transmission path 24, the clutch mechanism 27D connects a portion of the starting assist power transmission path 49, the electric motor 18 is rotated by the electric power supplied thereto, and thus, the rotation energy can be stored and kept in the rotary element 50 during the stopped state. That is, the rotation energy can be stored in the rotary element 50 by the method similar to the starting assist method of Embodiment 1.

In the starting assist system 45D, during driving, a portion of the power transmission path 24 is connected and a portion of the starting assist power transmission path 49 is connected, the rotation energy is stored in the rotary element 50, and then a portion of the starting assist power transmission path 49 is disconnected so that the electric motorcycle 1 can be accelerated while keeping the rotation energy in the rotary element. That is, the rotation energy can be stored in the rotary element 50 by the method similar to the starting assist method of Embodiment 1.

The starting assist system 45D according to Embodiment 5 has the same advantages as those of the starting assist system 45 according to Embodiment 1 and the starting assist system 45A according to Embodiment 2.

Embodiment 6

Figure 14:
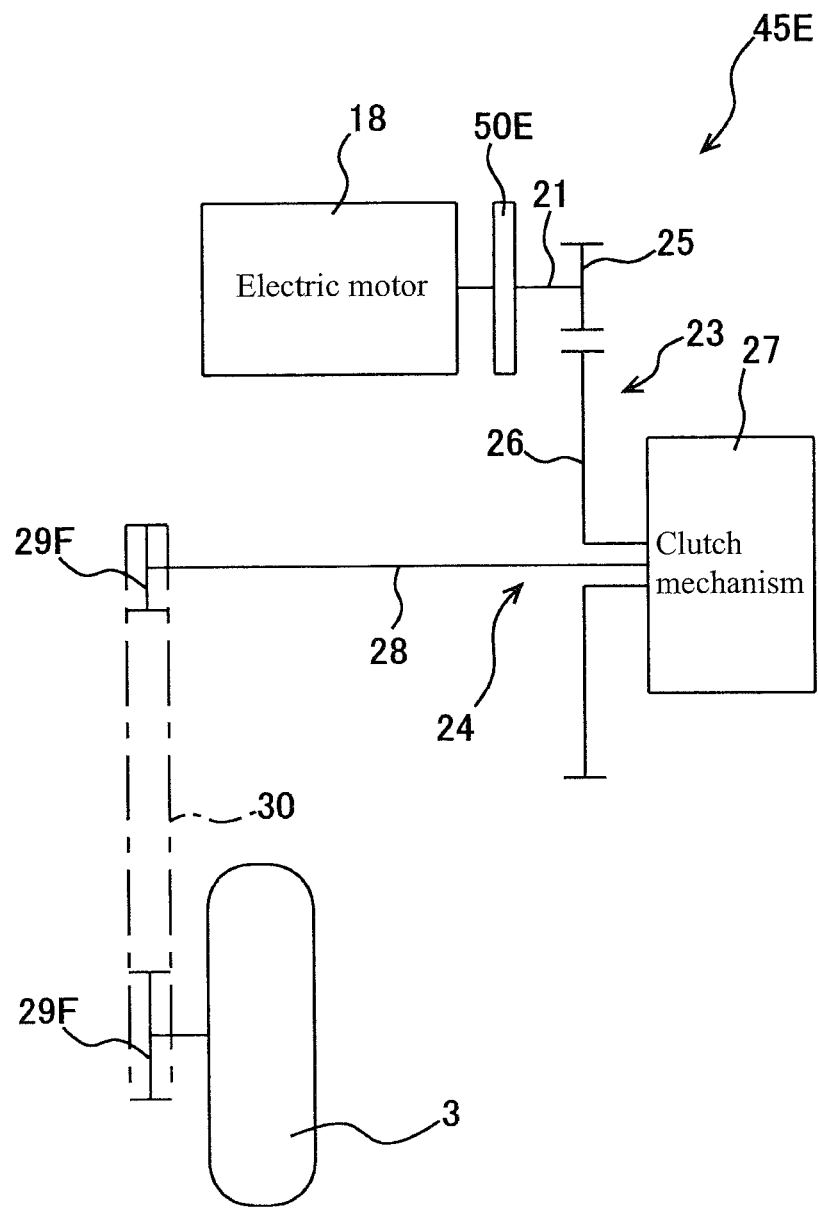
FIG. 14 is a block diagram schematically showing a configuration of a starting assist system according to Embodiment 6 of the present invention.

As shown in FIG. 14, a starting assist system 45E according to Embodiment 6 of the present invention is configured in such a manner that the starting assist system 45 according to Embodiment 1 is provided with a rotary element 50E separately from the rotor 20. The rotary element 50E is fastened to the output shaft 21 which is the rotary member and is rotatable with the output shaft 21.

In the starting assist system 45E according to Embodiment 6, like the starting assist system 45 according to Embodiment 1, the rotation energy can be stored and kept in the rotary element 50E during the stopped state of the electric motorcycle 1, and can be applied as the starting assist power to the rear wheel 3 during starting of the electric motorcycle 1.

Other Embodiments

Although the starting assist system 45 according to Embodiment 1 executes the method of automatically storing the rotation energy and the method of manually storing the rotation energy, it may execute only one of these methods. The starting assist system 45 according to Embodiment 1 is able to recover energy during deceleration and store the rotation energy, by executing the method similar to the starting assist method executed by the starting assist system 45A according to Embodiment 2. This makes it possible to efficiently use the rotation energy during driving, and hence further lessen the electric power consumption in the electric motor 18 during starting.

Although in the starting assist system 45A according to Embodiment 2, the rotation energy is stored during deceleration, it may be stored during a period other than deceleration (e.g., acceleration, or constant-speed driving). The energy storing completion condition is not limited to a condition set based on the rotating speed of the rotary element 50, but may be set based on the vehicle speed of the electric motorcycle 1 or time for which the rotation energy is stored. Specifically, the control section 34 may determine that the energy storing completion condition is satisfied when the vehicle speed of the electric motorcycle 1 is equal to or lower than a predetermined speed, or after predetermined time lapses after storing of the rotation energy is started.

Although in the starting assist system 45A according to Embodiment 2, the decelerated state is detected based on the operation of the brake lever 39 and the operation of the foot lever 43, it may be detected based on the speed obtained from the vehicle speed sensor 46. Although in the starting assist system 45A according to Embodiment 2, the starting assist condition and the non-assist condition are set based on the angular displacement amount θ of the accelerator grip 5a, it may be set based on a change amount ΔTH of the angular displacement amount θ of the accelerator grip 5a or a change amount Δ RPM of the rotating speed of the electric motor 18, instead of the angular displacement amount θ.

In the starting assist system 45A according to Embodiment 2, when a portion of the starting assist power transmission path 49 is connected in the starting/starting assist step, it is preferable that the force exerted on the plurality of clutch plates by the clutch driving mechanism 37 is mitigated gradually, and the plurality of clutch plates are gradually moved into contact with each other in a pressurized manner. This makes it possible to mitigate an impact generated when a portion of the starting assist power transmission path 49 is connected.

In a case where the rotary element 50, 50B is provided on the starting assist power transmission path 49, 49B which branches from the power transmission path 24A, 24B, like the starting assist system 45A according to Embodiment 2 and the starting assist system 45B according to Embodiment 3, the clutch driving mechanism 27A, 27B is activated automatically, when the disconnection condition is satisfied. Therefore, the clutch lever 41 may be omitted. In a case where the starting assist system 45 according to Embodiment 1 or the like executes only the method of automatically storing the rotation energy, the clutch lever 41 may be omitted as well.

Although in the starting assist systems 45, and 45A to 45E according to Embodiment 1 to Embodiment 6, the clutch mechanisms 27 and 27A to 27E are electrically activated, the clutch lever and the clutch mechanism may be mechanically coupled together, and the clutch mechanism may be activated mechanically in response to the operation of the clutch lever. Although the control section 34 adjusts supplying of the electric power to the electric motor 18 so that the rotational power transmitted to the rear wheel 3 corresponds to the angular displacement amount θ of the accelerator grip 5a in the case where the starting assist power is used, it may adjust the electric power to allow the electric motor 18 to generate the rotational power corresponding to the angular displacement amount θ of the accelerator grip 5a, and the starting assist power may be added to the generated rotational power. In this case, since the rotational power of a greater magnitude is applied to the rear wheel 3, the electric motorcycle 1 can attain an accelerative force of a greater magnitude.

In the starting assist systems 45, and 45A to 45E according to Embodiment 1 to Embodiment 6, a buffer member may be provided on each of the power transmission paths 24, and 24A to 24C to mitigate an impact generated when the starting assist power is applied to the rear wheel 3. Or, a transmission mechanism may be provided on each of the power transmission paths 24, and 24A to 24C in a location downstream of the clutch mechanisms 27 and 27A to 27E in a power transmission direction. The transmission mechanism may be a stage transmission mechanism or a non-stage transmission (continuously variable transmission mechanism).

Although in the above described embodiments, the electric motorcycle 1 has been described, the electric vehicle to which the starting assist systems 45, and 45A to 45E is applied is not limited to the electric motorcycle, but may be an electric four-wheeled vehicle or an electric three-wheeled vehicle, so long as the drive wheel is driven by the electric motor.

REFERENCE CHARACTERS LIST

1 electric motorcycle
3 rear wheel
16 controller
18, 18A, 18D electric motor
19, 19A stator
20, 20A rotor
21, 21A output shaft
23, 23A to 23C power transmission mechanism
24, 24A to 23C power transmission path
25 output gear
26 transmission gear
27, 27A to 27D clutch mechanism
34 control section
36 clutch driving section
37 clutch driving mechanism
45, 45A to 45E starting assist system
48 electric driving unit
49, 49B starting assist power transmission path
50, 50B, 50E rotary element
61, 61C coupling gear

The invention claimed is:

1. A starting assist method of an electric vehicle including an electric driving unit including an electric motor for rotating an output shaft by electric power supplied to the electric motor and a power transmission mechanism for transmitting rotational power of the output shaft to a drive wheel to rotate the drive wheel, the method comprising the steps of:
  applying rotational power of a rotary member included in the electric driving unit to a predetermined rotary element to rotate the rotary element to store a rotation energy in the rotary element;
  determining whether or not the electric vehicle is decelerated based on whether or not a deceleration operation is performed, in a state in which a rotary element disconnection mechanism disconnects the rotary member and the rotary element from each other;
  disconnecting the rotary member and the rotary element from each other, by the rotary element disconnection mechanism, to keep the rotation energy of the rotary element stored in the step of storing the rotation energy, during a stopped state of the electric vehicle; and
  during starting of the electric vehicle, connecting the rotary member and the rotary element to each other, by the rotary element disconnection mechanism, transmitting the rotation energy of the rotary element kept in the step of keeping the rotation energy to the drive wheel as starting assist power, and starting the electric vehicle using the starting assist power,
  wherein the step of storing the rotation energy is started after it is determined that the electric vehicle is decelerated in the step of determining whether or not the electric vehicle is decelerated, and the rotary member and the rotary element are connected to each other to store the rotation energy of the drive wheel in the rotary element in the step of storing the rotation energy.

2. The starting assist method of the electric vehicle according to claim 1, further comprising:
disconnecting a portion of a power transmission path from the electric motor to the drive wheel by a power transmission path disconnection mechanism provided on the power transmission path;
wherein the step of storing the rotation energy is executed during a period other than a certain period for which supplying of the electric power to the electric motor is halted, in the stopped state;
wherein in the step of storing the rotation energy, after the step of disconnecting a portion of the power transmission path, the electric motor which is the rotary member rotates as the rotary element an upstream member which is located upstream of the power transmission path disconnection mechanism in a power transmission direction on the power transmission path;
wherein in the step of keeping the rotation energy, a state in which a portion of the power transmission path is disconnected in the step of disconnecting a portion of the power transmission path is kept; and
wherein in the step of starting the electric vehicle using the starting assist power, a portion of the power transmission path is connected by the power transmission path disconnection mechanism, and the rotation energy of the upstream member rotating is transmitted as the starting assist power to the drive wheel via a downstream member which is located downstream of the power transmission path disconnection mechanism on the power transmission path.

3. The starting assist method of the electric vehicle according to claim 2, further comprising:
determining whether or not a predetermined energy storing start condition is satisfied, by an electric motor control device for controlling a rotation operation of the output shaft of the electric motor;
wherein the step of storing the rotation energy is started after it is determined that the energy storing start condition is satisfied in the step of determining whether or not the predetermined energy storing start condition is satisfied; the method further comprising:
halting supplying of the electric power to the electric motor after it is determined that a predetermined energy storing completion condition is satisfied in the step of storing the rotation energy.

4. The starting assist method of the electric vehicle according to claim 3, further comprising:
determining whether a starting assist mode in which the electric motor control device generates the starting assist power or a normal mode in which the electric motor control device does not generate the starting assist power has been selected;
wherein when it is determined that the starting assist mode has been selected in the step of determining whether the starting assist mode or the normal mode has been selected, the step of storing the rotation energy is permitted to be initiated; and
wherein when it is determined that the normal mode has been selected in the step of determining whether the starting assist mode or the normal mode has been selected, the step of storing the rotation energy is not permitted to be initiated.

5. The starting assist method of the electric vehicle according to claim 1,
wherein the rotary element disconnection mechanism is provided on a starting assist power transmission path which branches from the power transmission path from the electric motor to the drive wheel and connects the rotary member and the rotary element to each other; and
wherein in the step of keeping the rotation energy, driving power is able to be transmitted between the electric motor and the drive wheel on the power transmission path, and the rotary element disconnection mechanism disconnects the rotary member and the rotary element from each other.

6. The starting assist method of the electric vehicle according to claim 5, further comprising:
determining whether or not a predetermined termination condition is satisfied, in the step of starting the electric vehicle using the starting assist power; and
disconnecting the rotary member and the rotary element from each other by the rotary element disconnection mechanism to terminate starting assist when it is determined that the termination condition is satisfied in the step of determining whether or not the predetermined termination condition is satisfied.

7. The starting assist method of the electric vehicle according to claim 5, further comprising:
supplying the electric power to the electric motor to rotate the output shaft to start the electric vehicle, when the electric motor control device for controlling the rotation operation of the output shaft of the electric motor detects an acceleration command for increasing or decreasing a degree of acceleration in response to an operation amount of an acceleration command input device; and
wherein the step of starting the electric vehicle using the starting assist power and the step of starting the electric vehicle are executed when a predetermined starting assist condition is satisfied based on the acceleration command in the step of starting the electric vehicle; and
wherein in the step of starting the electric vehicle using the starting assist power, the rotary element disconnection mechanism connects the rotary member and the rotary element to each other.

8. The starting assist method of the electric vehicle according to claim 1,
wherein the deceleration operation is a brake operation.

9. The starting assist method of the electric vehicle according to claim 1,
wherein in the step of determining whether or not the electric vehicle is decelerated, it is determined that the electric vehicle is decelerated, when a speed of the electric vehicle is a predetermined speed or higher, and the deceleration operation is performed.

10. The starting assist method of the electric vehicle according to claim 1, further comprising:
supplying the electric power to the electric motor to rotate the output shaft to start the electric vehicle, when an electric motor control device for controlling rotation operation of the output shaft of the electric motor detects an acceleration command for increasing or decreasing a degree of acceleration in response to an operation amount of an acceleration command input device;
wherein the step of starting the electric vehicle using the starting assist power and the step of starting the electric vehicle are executed when a predetermined starting assist condition is satisfied based on the acceleration command in the step of starting the electric vehicle, wherein in the step of starting the electric vehicle using the starting assist power, the rotary element disconnection mechanism connects the rotary member and the rotary element to each other, and wherein the predetermined starting assist condition is such that the operation amount of the acceleration command input device is a predetermined amount or more.

11. A starting assist system of an electric vehicle including an electric driving unit including an electric motor for generating electric motor driving power by electric power supplied to the electric motor and a power transmission mechanism for transmitting the electric motor driving power to a drive wheel to rotate the drive wheel, the system comprising:

a rotary element which is rotatably supported and is rotatable by rotational power applied to the rotary element, by a rotary member included in the electric driving unit;

a switching mechanism which is provided between the rotary element and the drive wheel and is capable of performing switching between a connected state in which the rotary element and the drive wheel are connected to each other, and a disconnected state in which the rotary element and the drive wheel are disconnected from each other;

a switching mechanism activating device for activating the switching mechanism to cause the switching mechanism to perform switching between the connected state and the disconnected state;

an electric motor control device for controlling an operation of the electric motor by supplying the electric power to the electric motor; and a deceleration state determiner device for determining whether or not the electric vehicle is decelerated based on whether or not a deceleration operation is performed, in the disconnected state formed by the switching mechanism;

wherein when the deceleration state determiner device determines that the electric vehicle is decelerated, the switching mechanism activating device switches the switching mechanism to the connected state in which the rotary element and the drive wheel are connected to each other, during the stopped state of the electric vehicle, the switching mechanism activating device switches the switching mechanism to the disconnected state in which the rotary element and the drive wheel are disconnected from each other to rotate the rotary element by itself and to keep a rotation energy in the rotary element, and during starting of the electric vehicle, the switching mechanism activating device switches the switching mechanism to the connected state in which the rotary element and the drive wheel are connected to each other to transmit the rotation energy of the rotary element to the drive wheel as starting assist power different from the electric motor driving power.

12. The starting assist system of the electric vehicle according to claim 11, wherein the switching mechanism is provided on a power transmission path from the electric motor to the drive wheel;

and wherein the rotary element is an upstream member which is located upstream of the switching mechanism in a power transmission direction on the power transmission path.

13. The starting assist system of the electric vehicle according to claim 11, wherein the rotary element is provided on a starting assist power transmission path which branches from the power transmission path from the electric motor to the drive wheel.

14. The starting assist system of the electric vehicle according to claim 11, wherein the switching mechanism activating device includes a driving mechanism which activates the switching mechanism to switch the switching mechanism between the connected state and the disconnected state; and a control section for controlling an operation of the driving mechanism; and wherein the control section causes the driving mechanism to generate the starting assist power when the control section determines that a predetermined starting assist condition is satisfied.

15. The starting assist system of the electric vehicle according to claim 14, comprising:

an acceleration command input device for inputting an acceleration command for causing the electric vehicle to be accelerated;

wherein the control section controls the driving mechanism to cause the switching mechanism to switch to the connected state, when the acceleration command is input in a state in which the switching mechanism is in the disconnected state.

16. The starting assist system of the electric vehicle according to claim 11, further comprising:

a switching command input device for inputting a switching command for causing the switching mechanism to perform switching between the connected state and the disconnected state;

wherein the switching mechanism activating device activates the switching mechanism to perform switching between the connected state and the disconnected state in response to the switching command from the switching command input device.

17. The starting assist method of the electric vehicle according to claim 11, wherein the electric vehicle is an electric motorcycle.

18. A starting assist method of an electric vehicle including an electric driving unit including an electric motor for rotating an output shaft by electric power supplied to the electric motor and a power transmission mechanism for transmitting rotational power of the output shaft to a drive wheel to rotate the drive wheel, the method comprising the steps of:

applying rotational power of a rotary member included in the electric driving unit to a predetermined rotary element to rotate the rotary element to store a rotation energy in the rotary element;

disconnecting the rotary member and the rotary element from each other, by the rotary element disconnection mechanism, to keep the rotation energy of the rotary element stored in the step of storing the rotation energy, during a stopped state of the electric vehicle;

during starting of the electric vehicle, connecting the rotary member and the rotary element to each other, by the rotary element disconnection mechanism, to transmit the rotation energy of the rotary element kept in the step of keeping the rotation energy to the drive wheel as starting assist power, and starting the electric vehicle using starting assist power;

determining whether or not a predetermined termination condition is satisfied, in the step of starting the electric vehicle using the starting assist power; and when it is determined that the predetermined termination condition is satisfied in the step of determining whether or not the predetermined termination condition is satisfied, disconnecting the rotary member and the rotary element from each other by the rotary element disconnection mechanism to terminate starting assist, and transmitting the rotational power of the output shaft to the drive wheel in a state in which the rotary member and the rotary element are disconnected from each other.

19. The starting assist method of the electric vehicle according to claim 18,
wherein the predetermined termination condition is such that a speed of the electric vehicle exceeds a predetermined disconnection speed.

* * * * *